United States Patent
Elsherif et al.

(10) Patent No.: US 12,107,910 B2
(45) Date of Patent: Oct. 1, 2024

(54) LOW-LATENCY PARAMETER UPDATES FOR EXTENDED PERSONAL AREA NETWORKS

(71) Applicant: QUALCOMM Incorporated, San Diego, CA (US)

(72) Inventors: Ahmed Ragab Elsherif, San Jose, CA (US); Laurent Wojcieszak, Belfast (GB); Richard Turner, Belfast (GB)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/974,465

(22) Filed: Oct. 26, 2022

(65) Prior Publication Data
US 2024/0146793 A1    May 2, 2024

(51) Int. Cl.
| | |
|---|---|
| H04L 65/70 | (2022.01) |
| G06F 3/16 | (2006.01) |
| H04L 65/65 | (2022.01) |
| H04R 3/00 | (2006.01) |
| H04W 84/12 | (2009.01) |

(52) U.S. Cl.
CPC ............. *H04L 65/70* (2022.05); *G06F 3/162* (2013.01); *H04L 65/65* (2022.05); *H04R 3/00* (2013.01); *H04R 2420/07* (2013.01); *H04W 84/12* (2013.01)

(58) Field of Classification Search
CPC ......... H04L 65/70; H04L 65/65; G06F 3/162; H04R 3/00
See application file for complete search history.

(56) References Cited

U.S. PATENT DOCUMENTS

| | | | |
|---|---|---|---|
| 10,244,307 B1 * | 3/2019 | Tong | H04R 1/1091 |
| 10,728,941 B2 * | 7/2020 | Batta | H04M 1/6066 |
| 2005/0254526 A1 * | 11/2005 | Wang | H04L 65/1101 |
| | | | 370/503 |

(Continued)

OTHER PUBLICATIONS

International Search Report and Written Opinion—PCT/US2023/076659—ISA/EPO—Jan. 24, 2024 (2206451WO).

(Continued)

*Primary Examiner* — Nazia Naoreen
(74) *Attorney, Agent, or Firm* — Holland & Hart LLP

(57) ABSTRACT

This disclosure provides methods, components, devices and systems for low-latency parameter updates. In some aspects, a wireless communication device, such as a handset or an access point (AP), may transmit, to one or more wireless audio devices, an indication of a set of updated parameters associated with an extended personal area network (XPAN) of the wireless communication device. The wireless communication device may embed the indication of the set of updated parameters via a real-time protocol (RTP) header or in a padding section of a payload data of an audio data packet. A wireless audio device may extract the set of updated parameters from the audio data packet and may transmit an acknowledgement (ACK) to the wireless communication device. As a result of receiving an ACK from the wireless audio device(s), the wireless communication device may communicate with the wireless audio device(s) in accordance with the updated parameters.

30 Claims, 20 Drawing Sheets

(56) References Cited

U.S. PATENT DOCUMENTS

2019/0102143 A1* 4/2019 Kumar ................. H04L 1/0007
2019/0246221 A1* 8/2019 Shariati ................. H04N 21/00
2024/0063981 A1* 2/2024 Liu ..................... H04R 1/1041

OTHER PUBLICATIONS

Singer D., et al., "A General Mechanism for RTP Header Extensions; rfc8285.txt", Internet Engineering Task Force (IETF), Obsoletes: 5285, Standard, Internet Society (ISOC) 4, Rue Des Falaises CH-1205, Geneva, Switzerland, Oct. 26, 2017, pp. 1-25, XP015122249, Sections 4.1.2, 4.2, 4.3.

* cited by examiner

LOW-LATENCY PARAMETER UPDATES FOR EXTENDED PERSONAL AREA NETWORKS

TECHNICAL FIELD

The following relates to wireless communications, including low-latency parameter updates.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

SUMMARY

The systems, methods and devices of this disclosure each have several innovative aspects, no single one of which is solely responsible for the desirable attributes disclosed herein.

The described techniques relate to improved methods, systems, devices, or apparatuses that support low-latency parameter updates for extended personal area networks (XPANs), which may also be referred to as extended personal audio networks. For example, a wireless communication device, which may be a handset or an access point (AP), and a set of wireless earbuds may use downlink audio data packets to carry updated XPAN-related parameters. In some examples, the wireless communication device may embed a set of updated parameters in one or more fields of a real-time transport protocol (RTP) audio header of an audio data packet and may transmit the audio data packet to the wireless earbuds. Additionally, or alternatively, the wireless communication device may embed a set of updated parameters in a padding section of an audio data packet and may transmit the audio data packet to the wireless earbuds.

One innovative aspect of the subject matter described in this disclosure can be implemented in apparatus for wireless communication at a wireless communication device. The apparatus may include a processor, memory coupled with the processor, and instructions stored in the memory. The instructions may be executable by the processor to cause the apparatus to transmit, to a first wireless audio device via a first audio data packet and to a second wireless audio device via a second audio data packet, an indication of a set of updated parameters associated with a wireless network, receive a first feedback message from the first wireless audio device and a second feedback message from the second wireless audio device responsive to the first audio data packet and the second audio data packet, respectively, and transmit, to one or both of the first wireless audio device and the second wireless audio device, a set of audio data packets in accordance with the set of updated parameters associated with the wireless network and based on receiving the first feedback message and the second feedback message.

Another innovative aspect of the subject matter described in this disclosure can be implemented in a method for wireless communication at a wireless communication device. The method includes transmitting, to a first wireless audio device via a first audio data packet and to a second wireless audio device via a second audio data packet, an indication of a set of updated parameters associated with a wireless network, receiving a first feedback message from the first wireless audio device and a second feedback message from the second wireless audio device responsive to the first audio data packet and the second audio data packet, respectively, and transmitting, to one or both of the first wireless audio device and the second wireless audio device, a set of audio data packets in accordance with the set of updated parameters associated with the wireless network and based on receiving the first feedback message and the second feedback message.

Another innovative aspect of the subject matter described in this disclosure can be implemented in another apparatus for wireless communication at a wireless communication device. The apparatus may include means for transmitting, to a first wireless audio device via a first audio data packet and to a second wireless audio device via a second audio data packet, an indication of a set of updated parameters associated with a wireless network, means for receiving a first feedback message from the first wireless audio device and a second feedback message from the second wireless audio device responsive to the first audio data packet and the second audio data packet, respectively, and means for transmitting, to one or both of the first wireless audio device and the second wireless audio device, a set of audio data packets in accordance with the set of updated parameters associated with the wireless network and based on receiving the first feedback message and the second feedback message.

Another innovative aspect of the subject matter described in this disclosure can be implemented in non-transitory computer-readable medium storing code for wireless communication at a wireless communication device. The code may include instructions executable by a processor to transmit, to a first wireless audio device via a first audio data packet and to a second wireless audio device via a second audio data packet, an indication of a set of updated parameters associated with a wireless network, receive a first feedback message from the first wireless audio device and a second feedback message from the second wireless audio device responsive to the first audio data packet and the second audio data packet, respectively, and transmit, to one or both of the first wireless audio device and the second wireless audio device, a set of audio data packets in accordance with the set of updated parameters associated with the wireless network and based on receiving the first feedback message and the second feedback message.

In some examples of the method, apparatuses, and non-transitory computer-readable medium described herein, transmitting the indication of the set of updated parameters associated with the wireless network may include operations, features, means, or instructions for transmitting the indication of the set of updated parameters via one or more fields of a real-time transport protocol audio header of each of the first audio data packet and the second audio data packet.

In some examples of the method, apparatuses, and non-transitory computer-readable medium described herein, transmitting the indication of the set of updated parameters associated with the wireless network may include operations, features, means, or instructions for transmitting the indication of the set of updated parameters via a padding section of each of the first audio data packet and the second audio data packet.

Another innovative aspect of the subject matter described in this disclosure can be implemented in apparatus for wireless communication at a wireless audio device. The apparatus may include a processor, memory coupled with the processor, and instructions stored in the memory. The instructions may be executable by the processor to cause the apparatus to receive, from a wireless communication device via an audio data packet, an indication of a set of updated parameters associated with a wireless network, transmit, to the wireless communication device, a feedback message responsive to the audio data packet, and receive, from the wireless communication device, a set of audio data packets in accordance with the set of updated parameters associated with the wireless network and based on transmitting the feedback message.

Another innovative aspect of the subject matter described in this disclosure can be implemented in a method for wireless communication at a wireless audio device. The method may include receiving, from a wireless communication device via an audio data packet, an indication of a set of updated parameters associated with a wireless network, transmitting, to the wireless communication device, a feedback message responsive to the audio data packet, and receiving, from the wireless communication device, a set of audio data packets in accordance with the set of updated parameters associated with the wireless network and based on transmitting the feedback message.

Another innovative aspect of the subject matter described in this disclosure can be implemented in another apparatus for wireless communication at a wireless audio device. The apparatus may include means for receiving, from a wireless communication device via an audio data packet, an indication of a set of updated parameters associated with a wireless network, means for transmitting, to the wireless communication device, a feedback message responsive to the audio data packet, and means for receiving, from the wireless communication device, a set of audio data packets in accordance with the set of updated parameters associated with the wireless network and based on transmitting the feedback message.

Another innovative aspect of the subject matter described in this disclosure can be implemented in a non-transitory computer-readable medium storing code for wireless communication at a wireless audio device. The code may include instructions executable by a processor to receive, from a wireless communication device via an audio data packet, an indication of a set of updated parameters associated with a wireless network, transmit, to the wireless communication device, a feedback message responsive to the audio data packet, and receive, from the wireless communication device, a set of audio data packets in accordance with the set of updated parameters associated with the wireless network and based on transmitting the feedback message.

In some examples of the method, apparatuses, and non-transitory computer-readable medium described herein, receiving the indication of the set of updated parameters associated with the wireless network may include operations, features, means, or instructions for receiving the indication of the set of updated parameters via one or more fields of a real-time transport protocol audio header of the audio data packet.

In some examples of the method, apparatuses, and non-transitory computer-readable medium described herein, receiving the indication of the set of updated parameters associated with the wireless network may include operations, features, means, or instructions for receiving the indication of the set of updated parameters via a padding section of the audio data packet.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
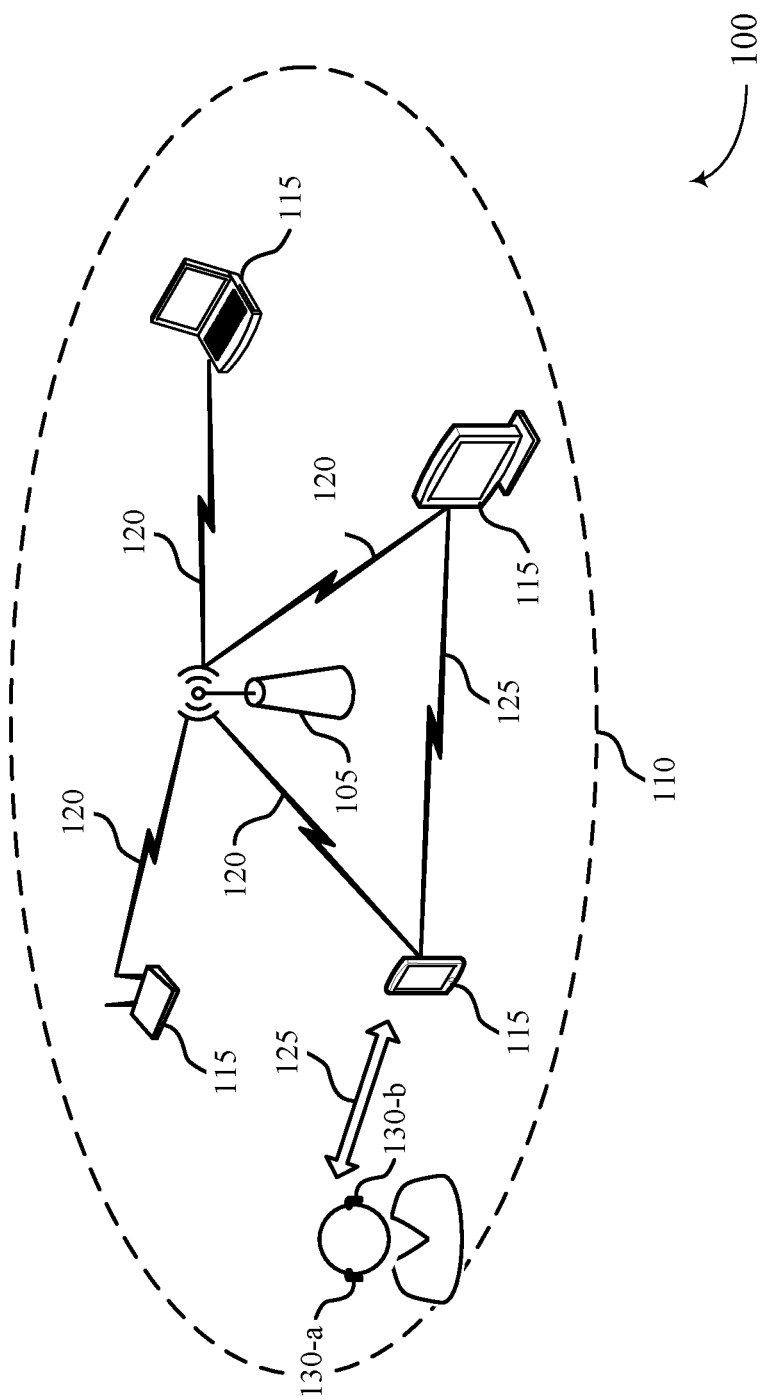
FIGS. 1 and 2 illustrate examples of wireless communications systems that support low-latency parameter updates for extended personal area networks (XPANs) in accordance with aspects of the present disclosure.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

In some deployments, a wireless communication device may support applications associated with low-latency or lossless audio to one or more other devices, such as one or more personal audio devices. For example, a wireless communication device may support applications and use cases associated with ultra-low-latency (ULL), such as ULL gaming, or streaming lossless audio to one or more personal audio devices (e.g., wireless earbuds) of a user. In scenarios in which a user uses two wireless earbuds, the wireless communication device may support an extended personal area network (XPAN) via which the wireless communication device may communicate with the two wireless earbuds. To meet a latency or lossless criteria associated with an application or use case, XPAN devices may employ a target wake time (TWT) technique for communication between the wireless communication device and the wireless earbuds. Initial or default TWT parameters may be set under an expectation for ideal (e.g., interference-free or approximately interference-free) conditions and may be updated in response to changing channel conditions or a changing concurrency situation at the wireless communication device. In some systems, the wireless earbuds and the wireless communication device may exchange one or more Bluetooth messages and implement a complete TWT teardown between the wireless communication device and each of the wireless earbuds. Such an exchange of Bluetooth messages and TWT teardown may introduce too much latency for some applications, such as ULL gaming or streaming lossless audio applications.

In some implementations, a wireless communication device, which may be a handset or an access point (AP), and a set of one or more wireless audio devices (e.g., wireless earbuds or a wireless headset) may use downlink audio data packets to carry updated TWT parameters or any other XPAN-related parameters that the wireless communication device and the wireless audio device(s) may indicate via wireless signaling. In some examples, the wireless communication device may embed a set of updated parameters (e.g., updated TWT parameters or other parameters associated with the XPAN) in one or more fields of a real-time transport protocol (RTP) audio header of an audio data packet and may transmit the audio data packet to the wireless audio device(s). Additionally, or alternatively, the wireless communication device may embed a set of updated parameters in a padding section of an audio data packet and may transmit the audio data packet to the wireless audio device(s). The wireless audio device(s) may acknowledge the audio data packet transmitted by the wireless communication device and the wireless communication device may communicate in accordance with the updated parameters based on receiving the acknowledgement from the wireless audio device(s). In examples in which the wireless audio device(s) includes two wireless earbuds, each wireless earbud may acknowledge the audio data packet transmitted by the wireless communication device and the wireless communication device may communicate in accordance with the updated parameters based on receiving the acknowledgement from each of the wireless earbuds.

Particular implementations of the subject matter described in this disclosure can be implemented to realize one or more of the following potential advantages. For example, as a result of transmitting an indication of a set of updated parameters to a set of one or more wireless audio devices in the course of normal data transmission, the wireless communication device may indicate updated parameters to the wireless audio device(s) with lower latency. For example, instead of initiating a teardown or employing some other reconfiguration or parameter update technique or procedure, the wireless communication device and the wireless audio device(s) may update parameters relatively more dynamically by indicating parameter updates via audio data packets or other data messages that the wireless communication device and the wireless audio device(s) may exchange. In accordance with achieving a lower latency for parameter updates, the wireless communication device and the wireless audio device(s) may react more suitably to changing channel conditions or a changing concurrency situation at the wireless communication device without compromising support for some applications, such as ULL gaming or streaming lossless audio applications. As such, implementations of the subject matter described in this disclosure may enhance a user experience and facilitate higher data rates, greater spectral efficiency, and greater system capacity.

Aspects of the disclosure are initially described in the context of a wireless communications system. Aspects of the disclosure are additionally illustrated by and described with reference to a process flow, audio data packets (e.g., audio data packet formats), a communication timeline, encoding formats, and example XPAN topologies. Aspects of the disclosure are further illustrated by and described with reference to apparatus diagrams, system diagrams, and flowcharts that relate to low-latency parameter updates for XPANs.

FIG. 1 illustrates a wireless communications system 100 (also known as a WLAN or a Wi-Fi network) configured in accordance with various aspects of the present disclosure. The wireless communications system 100 may include an access point (AP) 105 and multiple associated devices 115 (such as stations (STAs) or soft APs (SAPs), which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated devices 115 (e.g., associated STAs) may represent a BSS or an ESS. The various devices 115 in the network are able to communicate with one another through the AP 105. Also shown is a coverage area 110 of the AP 105, which may represent a BSA of the wireless communications system 100. An extended network station (not shown) associated with the wireless communications system 100 may be connected to a wired or wireless distribution system that may allow multiple APs 105 to be connected in an ESS.

Although not shown in FIG. 1, a device 115 may be located in the intersection of more than one coverage area 110 and may associate with more than one AP 105. A single AP 105 and an associated set of devices 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The wireless communications system 100 may include APs 105 of different types (e.g., metropolitan area, home network, etc.), with varying and overlapping coverage areas 110. Two devices 115 may also communicate directly via a direct wireless communication link 125 regardless of whether both devices 115 are in the same coverage area 110. Examples of direct wireless communication links 120 may include Wi-Fi Direct connections, Wi-Fi Tunneled Direct Link Setup (TDLS) links, and other group connections. Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communications system 100.

In some cases, a device 115 (or an AP 105) may be detectable by a central AP 105, but not by other devices 115 in the coverage area 110 of the central AP 105. For example, one device 115 may be at one end of the coverage area 110 of the central AP 105 while another device 115 may be at the other end. Thus, both devices 115 may communicate with the AP 105, but may not receive the transmissions of the other. This may result in colliding transmissions for the two devices 115 in a contention based environment (e.g., CSMA/CA) because the devices 115 may not refrain from transmitting on top of each other. A device 115 whose transmissions are not identifiable, but that is within the same coverage area 110 may be known as a hidden node. CSMA/CA may be supplemented by the exchange of an RTS packet transmitted by a sending device 115 (or AP 105) and a CTS packet transmitted by the receiving device 115 (or AP 105). This may alert other devices within range of the sender and receiver not to transmit for the duration of the primary transmission. Thus, RTS/CTS may help mitigate a hidden node problem.

The wireless communications system 100 may include an AP 105, devices 115 (e.g., which may be referred to as source devices, central devices, etc.), and paired devices 115 (e.g., which may be referred to as sink devices, peripheral devices, etc.) implementing WLAN communications (e.g., Wi-Fi communications) and/or Bluetooth communications. For example, devices 115 may include cell phones, user equipment (UEs), wireless stations (STAs), mobile stations, personal digital assistant (PDAs), other handheld devices, netbooks, notebook computers, tablet computers, laptops, or some other suitable terminology. Paired devices 115 may include Bluetooth-enabled devices capable of pairing with other Bluetooth-enabled devices (e.g., such as devices 115), which may include wireless audio devices (e.g., headsets, earbuds, speakers, earpieces, headphones), display devices (e.g., TVs, computer monitors), microphones, meters, valves, etc.

Bluetooth communications may refer to a short-range communication protocol and may be used to connect and exchange information between devices 115 and paired devices 115 (e.g., between mobile phones, computers, digital cameras, wireless headsets, speakers, keyboards, mice or other input peripherals, and similar devices). Bluetooth systems (e.g., aspects of wireless communications system 100) may be organized using a central-peripheral relationship employing a time-division duplex protocol having, for example, defined time slots of 625 microseconds, in which transmission alternates between the central device (e.g., a device 115) and one or more peripheral devices (e.g., paired devices 115). In some examples, a device 115 may generally refer to a central device, and a paired device 115 may refer to a peripheral device in the wireless communications system 100. As such, in some examples, a device may be referred to as either a device 115 or a paired device 115 based on the Bluetooth role configuration of the device. That is, designation of a device as either a device 115 or a paired device 115 may not necessarily indicate a distinction in device capability, but rather may refer to or indicate roles held by the device in the wireless communications system 100. Generally, device 115 may refer to a wireless communication device capable of wirelessly exchanging data signals with another device (e.g., a paired device 115), and paired device 115 may refer to a device operating in a peripheral role, or to a short-range wireless communication device capable of exchanging data signals with the device 115 (e.g., using Bluetooth communication protocols).

A communication link 125 may be established between two Bluetooth-enabled devices (e.g., between a device 115 and a paired device 115) and may provide for communications or services (e.g., according to some Bluetooth profile). The controller stack may be responsible for setting up communication links 125 such as asynchronous connection-oriented links, (or asynchronous connection-oriented connections), synchronous connection-orientated (SCO) links (or SCO connections), extended synchronous connection-oriented (eSCO) links (or eSCO connections), other logical transport channel links, etc. For example, a Bluetooth connection may be an eSCO connection for voice call (e.g., which may allow for retransmission), an ACL connection for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific device (e.g., paired device 115) are acknowledged, and may be retransmitted if not acknowledged during a retransmission window. In addition, audio may be streamed between a device 115 and a paired device 115 using an ACL connection (A2DP profile). In some cases, the ACL connection may occupy 1, 3, or 5 Bluetooth slots for data or voice. Other Bluetooth profiles supported by Bluetooth-enabled devices may include Bluetooth Low Energy (BLE) (e.g., providing considerably reduced power consumption and cost while maintaining a similar communication range), human interface device profile (HID) (e.g., providing low latency links with low power requirements), etc.

A device may, in some examples, be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some examples, Bluetooth and WLAN communications may share a same medium, such as the same unlicensed frequency medium. In such examples, a device 115 may support WLAN communications via AP 105 (e.g., over communication links 120). The AP 105 and the associated devices 115 may represent a basic service set (BSS) or an extended service set (ESS). The various devices 115 in the network may be able to communicate with one another through the AP 105. In some cases the AP 105 may be associated with a coverage area, which may represent a basic service area (BSA).

Devices 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100, and devices may communicate with each other via communication links 120 (e.g., Wi-Fi Direct connections, Wi-Fi Tunneled Direct Link Setup (TDLS) links, peer-to-peer communication links, other peer or group connections). AP 105 may be coupled to a network, such as the Internet, and may enable a device 115 to communicate via the network (or communicate with other devices 115 coupled to the AP 105). A device 115 may communicate with a network device bi-directionally. For example, in a WLAN, a device 115 may communicate with an associated AP 105 via downlink (e.g., the communication link from the AP 105 to the device 115) and uplink (e.g., the communication link from the device 115 to the AP 105).

In some examples, content, media, audio, etc. exchanged between a device 115 and a paired device 115 may originate from a WLAN. For example, in some examples, device 115 may receive audio from an AP 105 (e.g., via WLAN communications), and the device 115 may then relay or pass the audio to the paired device 115 (e.g., via Bluetooth communications). In some examples, certain types of Bluetooth communications (e.g., such as high quality or high definition (HD) Bluetooth) may require enhanced quality of service. For example, in some examples, delay-sensitive Bluetooth traffic may have higher priority than WLAN traffic.

In some deployments, a wireless communication device may support applications associated with low-latency or lossless audio to one or more other devices, such as one or more personal audio devices (e.g., personal wireless audio devices). For example, a wireless communication device may support applications and use cases associated with ULL, such as ULL gaming, or streaming lossless audio to one or more personal audio devices (e.g., wireless audio devices) of a user. In scenarios in which a user uses two wireless audio devices (e.g., a wireless audio device 130-$a$ and a wireless audio device 130-$b$), the wireless communication device may support an XPAN via which the wireless communication device may communicate with the two wireless audio devices. Further, although described in the context of two wireless audio devices (e.g., two wireless earbuds), the described techniques may also apply to a single wireless audio device (e.g., a headset).

To meet a latency or lossless criteria associated with an application or use case, XPAN devices may employ a TWT technique for communication between the wireless communication device and the wireless audio devices. Initial or default TWT parameters may be set under an expectation for ideal (e.g., interference-free or approximately interference-free) conditions and may be updated in response to changing channel conditions or a changing concurrency situation at the wireless communication device. In some systems, the wireless audio devices and the wireless communication device may exchange one or more Bluetooth messages and implement a complete TWT teardown between the wireless communication device and each of the wireless audio devices. Such an exchange of Bluetooth messages and TWT teardown may introduce too much latency for some applications, such as ULL gaming or streaming lossless audio applications.

In some implementations, a wireless communication device, which may be a device 115 (e.g., a handset) or an AP 105, and a set of wireless audio devices may use downlink audio data packets to carry updated TWT parameters or any other XPAN-related parameters that the wireless communication device and the wireless audio devices may indicate via wireless signaling. In some examples, the wireless communication device may embed a set of updated parameters (e.g., updated TWT parameters or other parameters associated with the XPAN) in one or more fields, such as one or more contributing source (CSRC) fields, of an RTP audio header of an audio data packet and may transmit the audio data packet to the wireless audio devices. Additionally, or alternatively, the wireless communication device may embed a set of updated parameters in a padding section of an audio data packet and may transmit the audio data packet to the wireless audio devices. The wireless audio devices may each acknowledge the audio data packet transmitted by the wireless communication device and the wireless communication device may communicate in accordance with the updated parameters based on receiving the acknowledgement from each of the wireless audio devices.

In accordance with the example implementations described herein, various devices may use over-the-air transmissions to indicate updated parameters (e.g., updated XPAN-related parameters, such as updated TWT parameters) via one or both of RTP audio header CSRC fields or padding fields in a payload data section. As such, the various devices may use a sequence of over-the-air packet transmissions to change or update a set of parameters (e.g., a set of TWT parameters). For example, via audio data packet transmissions, the various devices may configure, trigger, or indicate an increase or a decrease in audio packet periodicity (e.g., when TWT SI is changed). Further, in accordance with the described techniques, such devices may avoid an explicit TWT teardown, request, and response frame exchange and may instead achieve a TWT sequence change after RTP audio header CSRC fields or padding section indicates updated TWT parameters.

Figure 2:
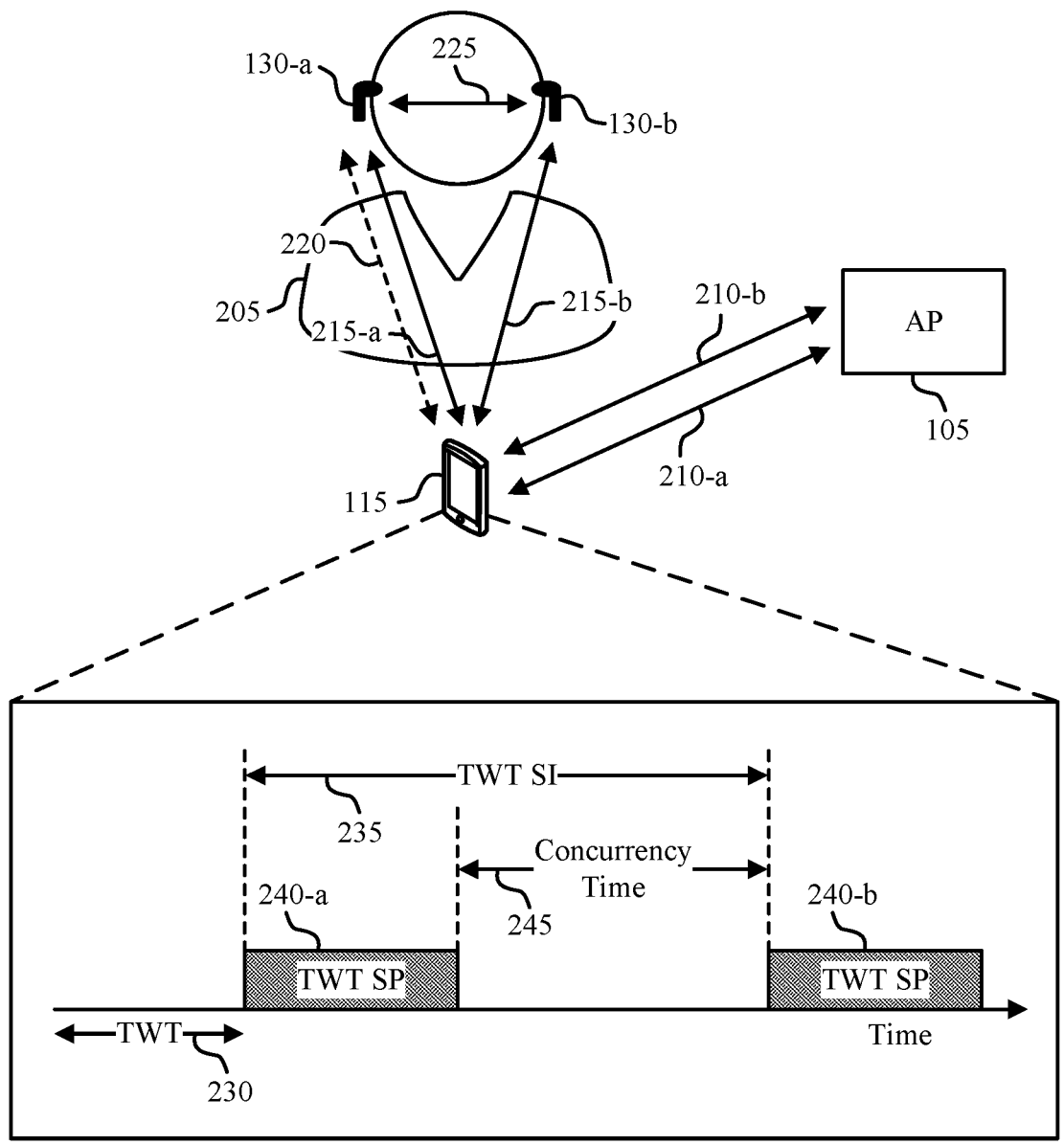

FIG. 2 illustrates an example of a wireless communications system 200 that supports low-latency parameter updates for extended personal area networks in accordance with one or more aspects of the present disclosure. The wireless communications system 200 may implement or be implemented to realize aspects of the wireless communications system 100. For example, the wireless communications system 200 illustrates communication between an AP 105, a device 115 (e.g., a handset or handheld device), and a wireless audio device 130-a and a wireless audio device 130-b of a user 205, which may be examples of corresponding devices as illustrated by and described with reference to FIG. 1. In some implementations, the device 115, the wireless audio device 130-a, and the wireless audio device 130-b may support a signaling-based mechanism according to which the device 115 may transmit an indication of a set of updated parameters to each of the wireless audio device 130-a and the wireless audio device 130-b via one or audio data packets. As described herein, the set of updated parameters may include any communication-related or proprietary parameters between the wireless communication device and at least one wireless audio device. The wireless audio device 130-a and the wireless audio device 130-b may be examples of wireless earbuds, a wireless headset, stereo speakers, or surround-sound devices, among other examples.

In some deployments, the device 115 may communicate with the AP 105 via one or both of a link 210-a and a link 210-b, which may be examples of infrastructure links between the AP 105 and the device 115. The link 210-a may be an example of a 2.4 GHz link between the AP 105 and the device 115 and the link 210-b may be an example of a 5 GHz link or a 6 GHz link between the AP 105 and the device 115. Further, the device 115 may communicate wirelessly with each of the wireless audio device 130-a and the wireless audio device 130-b, where each of the wireless audio device 130-a and the wireless audio device 130-b may be associated with an XPAN of the device 115. For example, the device 115 may communicate with the wireless audio device 130-a via a link 215-a and may communicate with the wireless audio device 130-b via a link 215-b, where the link 215-a and the link 215-b may be referred to or understood as XPAN links. The link 215-a may be an example of a 5 GHz link or a 6 GHz link and the link 215-b may be an example of a 5 GHz link or a 6 GHz link. Additionally, in some examples, the device 115 may communicate with the wireless audio device 130-a, which may be an example of a primary earbud, via a communication link 220. The communication link 220 may be an example of a Bluetooth link between the device 115 and the wireless audio device 130-a. The wireless audio device 130-a and the wireless audio device 130-b, which may be an example of a secondary earbud, may communicate with each other via a link 225, which may be an example of a Bluetooth link between the wireless audio device 130-a and the wireless audio device 130-b.

In some cases, the device 115, the wireless audio device 130-a, and the wireless audio device 130-b may support or belong to an XPAN and may use the XPAN to support one or more applications or use cases, such as applications or use cases associated with a latency or lossless audio constraint or criteria. For example, the device 115 may support one or more use cases of ULL gaming and streaming lossless audio to the wireless audio device 130-a and the wireless audio device 130-b (e.g., personal devices of the device 115). For such applications, the device 115 may be expected to keep end-to-end latency below a relatively stringent latency target (e.g., 40 ms for ULL gaming). Further, the device 115 may also be tasked with handling (e.g., gracefully handling) a coexistence of XPAN traffic (e.g., traffic to or from one or both of the wireless audio device 130-a and the wireless audio device 130-b) with other concurrency scenarios the user 205 or the system may initiate. Such other concurrency scenarios may include a scan concurrency for channel selection, STA infrastructure link concurrency for online gaming or other traffic to or from the AP 105, or neighbor aware networking (NAN) discovery and NAN data transfer, or any combination thereof.

As such, the device 115 may be expected to meet a latency constraint for various applications or use cases (e.g., an ultra-low-latency constraint for a ULL gaming use case) and also facilitate coexistence between XPAN and other concurrency scenarios on the device 115. To meet the latency constraints associated with, for example, ULL gaming, a power constraint of the wireless audio device 130-a and the wireless audio device 130-b, power and concurrency constraints at the device 115, the device 115 may employ a TWT technique for the communication between the device 115 (which may act or function as a soft AP (SAP)) and each of the wireless audio device 130-a and wireless audio device 130-b (which may act or function as STAs).

Example TWT parameters include a TWT 230, a TWT service interval (SI) 235, and a TWT service period (SP) 240. A TWT 230 may indicate or be associated with a timing synchronization function (TSF) time indicating a start or beginning of a first TWT session. A TWT SI 235 may indicate a TWT interval, which may refer to a time difference between a start or beginning of two consecutive TWT sessions. A TWT SP 240 may indicate a duration during which one or both of the wireless audio device 130-a and the wireless audio device 130-b are awake during a TWT SI 235. In some aspects, a TWTP SP 240 may be referred to or understood as a TWT session. As such, and as illustrated by FIG. 2, the TWT SI 235 may indicate a time difference between a TWT SP 240-a and a TWT 240-b. A remainder of time within a TWT SI 235 excluding a TWT SP 240 may be referred to or understood as a concurrency time 245 during which the device 115 may perform any operations (e.g., transmission or reception) associated with a concurrency scenario at the device 115. In other words, the difference between XPAN TWT SI 235 and XPAN TWT SP 240 may be the time left for the device 115 to support other concurrencies (e.g., outside of any channel switching or software overheads).

For XPAN, each of the wireless audio device 130-a and the wireless audio device 130-b (which may be examples of TWT requesting STAs) may initiate a TWT session with the device 115 (which may be an example of a TWT responding STA). Further, for low-latency use cases (e.g., ULL gaming use cases), a target end-to-end latency may be relatively stringent (e.g., less than or equal to approximately 40 ms), which may be tied to, associated with, or expect a Wi-Fi latency in a specific range (e.g., in the sub-10 ms range). To achieve such a Wi-Fi latency, a TWT SI 235 and a TWT SP 240 may be selected or set to specific values (e.g., a TWT SI 235 may be set to 4 ms with a TWT SP 240 of 2 ms). Further, for a lossless audio use case, for example, a TWT SI 235 may be set to approximately 70 ms with a TWT SP 240 of approximately 23 ms.

In some cases, a default or initial set of TWT parameters for XPAN may be configured or set expecting ideal (e.g., interference-free or approximately interference-free) conditions (e.g., link conditions, channel conditions, or environmental conditions). In some deployments, Wi-Fi channel conditions, a concurrency situation of the device 115, or XPAN constraints may change over time. Such changes may trigger, be associated with, or mandate a TWT parameter update. Further, in applications or use cases associated with low-latency (e.g., ULL gaming and streaming lossless audio), the TWT parameter update may be expected to be performed with low latency to continue to meet XPAN constraints without compromising a user experience. As an example, for XPAN gaming use cases, a TWT SP 240 may be approximately 2 ms. As such, a communication overhead of the updated TWT parameters, or other information communicated from the device 115 to the wireless audio device 130-a and the wireless audio device 130-b, may also be expected to be relatively small.

In some systems, however, a TWT parameter update procedure may be associated with a relatively high latency. Further, because TWT sessions may be initiated by the wireless audio device 130-a and the wireless audio device 130-b (with default or initial parameters), any update for TWT parameters triggered by a condition change on the device 115 may involve the device 115 transmitting the updated parameters to the wireless audio device 130-a and the wireless audio device 130-b followed by a TWT parameter change at the wireless audio device 130-a and the wireless audio device 130-b.

An example TWT parameter update procedure may include a sequence of signaling steps that involve one or more transmissions using a Bluetooth link, which may introduce relatively large delays. For example, a Wi-Fi sub-system (SS) of the device 115 may send, to a Bluetooth host (BT host) of the device 115, a request (e.g., a TWT parameter update request) to update one or more TWT parameters after one or more conditions are detected that trigger one or more TWT parameter changes. The BT host of the device 115 may communicate an updated set of TWT parameters to a BT host of a primary earbud (e.g., the wireless audio device 130-a) using a Bluetooth link. Such an updated TWT configuration sent via a Bluetooth link may add approximately 80 ms of delay. The BT host of the primary earbud may signal the new TWT parameters internally to a Wi-Fi SS of the primary earbud and the BT host of the primary earbud may communicate the new TWT parameters to a BT host of a secondary earbud (e.g., the wireless audio device 130-b) using a Bluetooth link. Such an indication of a TWT configuration via a Bluetooth link between the primary earbud and the secondary earbud may add approximately 120 ms of delay. The BT host of the secondary earbud may signal the new TWT parameters internally to a Wi-Fi SS of the secondary earbud.

The Wi-Fi SS of the primary earbud may start a TWT session teardown and parameter update process. The TWT session tear down and parameter update process may involve a transmission, from the Wi-Fi SS of the primary earbud to the Wi-Fi SS of the device 115 via an XPAN Wi-Fi link, of a TWT Teardown message and a TWT Request message that carries the new TWT parameters and a transmission, from the Wi-Fi SS of the device 115 to the Wi-Fi SS of the primary earbud via the XPAN Wi-Fi link, of an acknowledgement (ACK) of the new TWT parameters with a TWT Response message. The Wi-Fi SS of the device 115 may update the BT host of the device 115 that a new TWT session with the primary earbud has been established (e.g., the Wi-Fi SS may indicate a TWT session update to the BT host). Such a TWT session teardown and parameter update process may additionally be performed between the device 115 and the secondary earbud.

In accordance with such a TWT parameter update procedure, the device 115 may incur a relatively large delay between the time a condition is triggered on the device 115 associated with a TWT parameter update and the time the updated parameters take effect. For example, some components of the delay may include a delay of approximately 80 ms associated with the updated TWT configuration sent via the Bluetooth link between the device 115 and the primary earbud, a delay of approximately 100 ms associated with a sniff exit delay if the Bluetooth link between the two earbuds is in sniff mode, a delay of approximately 20 ms associated with the updated TWT configuration sent via the Bluetooth link between the two earbuds, and a delay of approximately 5 ms associated with the teardown of the TWT sessions and the re-establishment of new TWT sessions from both earbuds. Accordingly, such a TWT parameter update procedure may be associated with a total end-to-end delay of approximately 205 ms for a one-time TWT parameter update, which may be too much for some applications or use cases (e.g., ULL gaming and streaming lossless audio use cases).

In some implementations, the device 115, the wireless audio device 130-a, and the wireless audio device 130-b may support a data packet generation- and signaling-based mechanism according to which the device 115 may embed an indication of one or more updated parameters in one or more audio data packets that the device 115 may transmit to the wireless audio device 130-a and the wireless audio device 130-b. For example, if the device 115 detects a change that triggers a parameter update, or if the device 115 otherwise determines to transmit a set of parameters to the wireless audio device 130-a and the wireless audio device 130-b with low latency, the device 115 may embed the parameters in one or more downlink audio data packets and may transmit the one or more downlink audio data packets to the wireless audio device 130-a and the wireless audio device 130-a. In some implementations, the device 115 may transmit an indication of the parameters to the wireless audio device 130-a via a first audio data packet transmitted using a first Wi-Fi link (e.g., a first XPAN Wi-Fi link) and may transmit an indication of the parameters to the wireless audio device 130-b via a second audio data packet transmitted using a second Wi-Fi link (e.g., a second XPAN Wi-Fi link). The first audio data packet and the second audio data packet may include the same information or may include different information, and each may be examples of physical layer convergence protocol (PLCP) protocol data units (PPDUs).

As such, the device 115 may convey a set of one or more parameters to both of the wireless audio device 130-a and the wireless audio device 130-b in the course of expect downlink data transmissions or traffic (e.g., without using any additional or dedicated signaling). In accordance with such a lack of additional over-the-air Bluetooth or Wi-Fi signaling between the device 115 and each of the wireless audio device 130-a and the wireless audio device 130-b, and between the wireless audio device 130-a and the wireless audio device 130-b, a total end-to-end delay may be one or a relatively small quantity of TWT SIs 235, which may correspond to a delay of approximately 4 or 8 ms for some applications or use cases (e.g., ULL gaming). Such a delay of approximately 4 or 8 ms may represent a significant cut down in end-to-end delay of TWT parameter renegotiation compared to other example parameter update procedures (which may incur delays of approximately 205 ms).

As such, the device 115, the wireless audio device 130-a, and the wireless audio device 130-b may achieve up to approximately 50× faster response time to any condition change on an XPAN or infrastructure link associated with the device 115. In other words, the described techniques may allow or facilitate an agile XPAN system that can adapt to changing wireless conditions associated with an XPAN or infrastructure link at the device 115. Accordingly, the described techniques may be applicable to any latency-sensitive applications or use cases using TWT as the communication protocol between potentially power-constrained devices or any other use cases that are associated with or expect low-latency XPAN parameter updates from a default or initial set of programmed values. Further, although described in the context of the wireless audio device 130-*a* and the wireless audio device 130-*b*, the described techniques may be applicable to any one or more wireless audio devices. For example, the described techniques may be applicable to wireless earbuds, a wireless headset, a wireless hands-free device, or a wireless speaker, among other examples of wireless audio devices.

Further, the described techniques may allow or facilitate an updating of one or more TWT parameters at the same time and may additionally, or alternatively, be used for communicating any other information (XPAN-related or otherwise) between the device 115, the wireless audio device 130-*a*, and the wireless audio device 130-*b* in a fast and efficient way. For examples, the parameters that may be communicated between the device 115 and each of the wireless audio device 130-*a* and the wireless audio device 130-*b* may include a set of one or more TWT parameters, a receive signal strength indicator (RSSI) measured at either the device 115 or one or both of the wireless audio device 130-*a* and the wireless audio device 130-*b* that is expected to be communicated to the device 115 or one or both of the wireless audio device 130-*a* and the wireless audio device 130-*b*, a channel switch indication or request, or a bearer switch indication or request. Such one or more TWT parameters may include any one or more of a TWT SI 235, a TWT SP 240, or a TWT start time (e.g., a TWT 230). Further, such a bearer switch indication or request may be a request for a switch from an XPAN bearer to a Bluetooth bearer, or vice versa.

Figure 3:
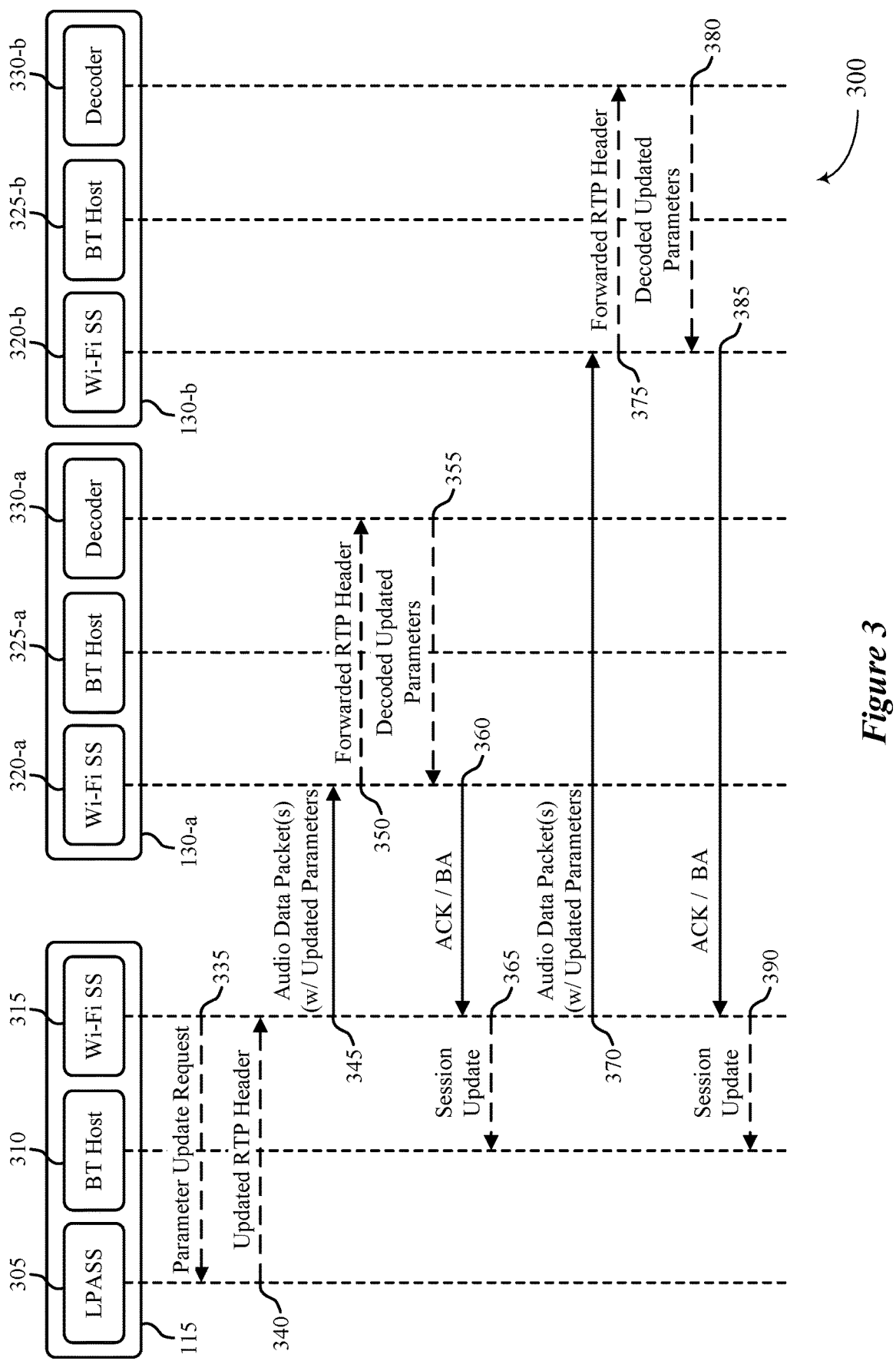
FIG. 3 illustrates an example of a process flow that supports low-latency parameter updates for XPANs in accordance with one or more aspects of the present disclosure.

FIG. 3 illustrates an example of a process flow 300 that supports low-latency parameter updates for extended personal area networks in accordance with one or more aspects of the present disclosure. The process flow 300 may implement or be implemented to realize aspects of the wireless communications system 100 or the wireless communications system 200. For example, the process flow 300 illustrates communication between a device 115, a wireless audio device 130-*a*, and a wireless audio device 130-*b*, which may be examples of corresponding devices as illustrated by and described with reference to FIGS. 1 and 2. In some implementations, the device 115, the wireless audio device 130-*a*, and the wireless audio device 130-*b* may employ a technique for low-latency communication of XPAN TWT parameters or any other information between the device 115 (e.g., a handset) and each of the wireless audio device 130-*a* and the wireless audio device 130-*b*.

The device 115 may include a low power audio SS (LPASS) 305, a BT host 310, and a Wi-Fi SS 315. The wireless audio device 130-*a* may include a Wi-Fi SS 320-*a*, a BT host 325-*a*, and a decoder 330-*a*. Similarly, the wireless audio device 130-*b* may include a Wi-Fi SS 320-*b*, a BT host 325-*b*, and a decoder 330-*b*. Each of the device 115, the wireless audio device 130-*a*, and the wireless audio device 130-*b* may support both internal signaling mechanisms (which may be associated with wired links) and over-the-air signaling mechanisms between each other.

In the following description of the process flow 300, the operations may be performed (such as reported or provided) in a different order than the order shown, or the operations performed by the example devices may be performed in different orders or at different times. Some operations also may be left out of the process flow 300, or other operations may be added to the process flow 300. Further, although some operations or signaling may be shown to occur at different times for discussion purposes, these operations may actually occur at the same time.

At 335, the Wi-Fi SS 315 of the device 115 may transmit, to the LPASS 305 of the device 115, a parameter update request. In some implementations, the Wi-Fi SS 315 may communicate a set of updated parameters to the LPASS 305 via one or more shadow registers. In some examples, the device 115 may trigger the signaling of the parameter update request in accordance with detecting some condition change at the device 115.

At 340, the LPASS 305 of the device 115 may transmit, to the Wi-Fi SS 315 of the device 115, an updated RTP header. In some implementations, the LPASS 305 may include an indication of a presence of the updated parameters in a corresponding audio data packet via the updated RTP header. For example, the LPASS 305 may set a bit or field in the RTP header to a specific value to indicate that the RTP header or payload data, or both, includes the updated parameters. In some implementations, the LPASS 305 may further embed the new parameters in one or more optional CSRC fields in the TRP audio header.

At 345, the Wi-Fi SS 315 of the device 115 may transmit, to the Wi-Fi SS 320-*a* of the wireless audio device 130-*a*, a first audio data packet (e.g., first audio downlink data, a first set of one or more audio data packets, etc.) with an indication of the set of updated parameters embedded in the first audio data packet. In other words, the Wi-Fi SS 315 of the device 115 may send audio downlink data to the wireless audio device 130-*a* (e.g., the primary earbud) with the set of updated parameters embedded therein. In some implementations, the Wi-Fi SS 315 of the device 115 may embed the set of updated parameters in the RTP audio header. Additionally, or alternatively, the Wi-Fi SS 315 of the device 115 may embed the set of updated parameters in a payload data of the first audio data packet (e.g., in a padding section of the payload data).

In some implementations, the wireless audio device 130-*a* may decode or process the first audio data packet at the Wi-Fi SS 320-*a* of the wireless audio device 130-*a* (e.g., for extraction and identification of the set of parameters indicated via the first audio data packet). In some other implementations, the wireless audio device 130-*a* may forward the first audio data packet (or at least the RTP audio header of the first audio data packet) to the decoder 330-*a* of the wireless audio device 130-*a* for decoding and processing of the first audio data packet (e.g., for extraction and identification of the set of parameters indicated via the first audio data packet).

At 350, for example, the Wi-Fi SS 320-*a* of the wireless audio device 130-*a* may forward the first audio data packet (or at least an RTP audio header of the first audio data packet) to the decoder 330-*a* of the wireless audio device 130-*a*. In other words, the Wi-Fi SS 320-*a* may forward the RTP audio header to the decoder 330-*a* (e.g., an audio decoder) to parse the set of updated parameters indicated via the first audio data packet.

At 355, the decoder 330-*a* of the wireless audio device 130-*a* may transmit the set of decoded updated parameters to the Wi-Fi SS 320-*a* of the wireless audio device 130-*a*. In other words, the audio decoder 330-*a* may internally signal the decoded updated parameters to the Wi-Fi SS 320-*a*.

At 360, the Wi-Fi SS 320-*a* of the wireless audio device 130-*a* may transmit an ACK or a block ACK (BA) to the Wi-Fi SS 315 of the device 115 to acknowledge reception of the first audio data packet and (at least implicitly) to acknowledge reception of the updated parameters conveyed via the first audio data packet.

At 365, the Wi-Fi SS 315 of the device 115 may transmit, to the BT host 310 of the device 115, a session update associated with the updated parameters. In some implementations, the Wi-Fi SS 315 may update the BT host 310 with an indication that the updated parameters have successfully been negotiated with the wireless audio device 130-*a* responsive to receiving the ACK or BA from the wireless audio device 130-*a* at 360.

At 370, the Wi-Fi SS 315 of the device 115 may transmit, to the Wi-Fi SS 320-*b* of the wireless audio device 130-*b*, a second audio data packet (e.g., second audio downlink data, a second set of one or more audio data packets, etc.) with an indication of the set of updated parameters embedded in the second audio data packet. In other words, the Wi-Fi SS 315 of the device 115 may send audio downlink data to the wireless audio device 130-*b* (e.g., the secondary earbud) with the set of updated parameters embedded therein. In some implementations, the Wi-Fi SS 315 of the device 115 may embed the set of updated parameters in the RTP audio header. Additionally, or alternatively, the Wi-Fi SS 315 of the device 115 may embed the set of updated parameters in a payload data of the second audio data packet (e.g., in a padding section of the payload data). The second audio data packet may include same payload information as the first audio data packet or may include different payload information as compared to the first audio data packet.

In some implementations, the wireless audio device 130-*b* may decode or process the second audio data packet at the Wi-Fi SS 320-*b* of the wireless audio device 130-*b* (e.g., for extraction and identification of the set of parameters indicated via the second audio data packet). In some other implementations, the wireless audio device 130-*b* may forward the second audio data packet (or at least the RTP audio header of the second audio data packet) to the decoder 330-*b* of the wireless audio device 130-*b* for decoding and processing of the second audio data packet (e.g., for extraction and identification of the set of parameters indicated via the second audio data packet).

At 375, for example, the Wi-Fi SS 320-*b* of the wireless audio device 130-*b* may forward the second audio data packet (or at least an RTP audio header of the second audio data packet) to the decoder 330-*b* of the wireless audio device 130-*b*. In other words, the Wi-Fi SS 320-*b* may forward the RTP audio header to the decoder 330-*b* (e.g., an audio decoder) to parse the set of updated parameters indicated via the second audio data packet.

At 380, the decoder 330-*b* of the wireless audio device 130-*b* may transmit the set of decoded updated parameters to the Wi-Fi SS 320-*b* of the wireless audio device 130-*b*. In other words, the audio decoder 330-*b* may internally signal the decoded updated parameters to the Wi-Fi SS 320-*b*.

At 385, the Wi-Fi SS 320-*b* of the wireless audio device 130-*b* may transmit an ACK or a BA to the Wi-Fi SS 315 of the device 115 to acknowledge reception of the second audio data packet and (at least implicitly) to acknowledge reception of the updated parameters conveyed via the second audio data packet.

At 390, the Wi-Fi SS 315 of the device 115 may transmit, to the BT host 310 of the device 115, a session update associated with the updated parameters. In some implementations, the Wi-Fi SS 315 may update the BT host 310 with an indication that the updated parameters have successfully been negotiated with the wireless audio device 130-*b* responsive to receiving the ACK or BA from the wireless audio device 130-*b* at 385.

As such, the device 115 may communicate a set of parameters (e.g., a set of updated parameters) to both the wireless audio device 130-*a* and the wireless audio device 130-*b* via audio downlink data and may update the BT host 310 (and communication sessions, such as TWT sessions between the device 115 and each of the wireless audio device 130-*a* and the wireless audio device 130-*b*) responsive to receiving feedback acknowledging reception of the audio downlink data from the wireless audio device 130-*a* and the wireless audio device 130-*b*. In some aspects, the updated parameters (e.g., the updated TWT parameters) may take effect starting in a next TWT SI if at least one full packet exchange sequence, from downlink audio packet (e.g., downlink audio PPDU) to ACK or BA (for both the first wireless audio device 130-*a* and the second wireless audio device 130-*b*), is completed in a single TWT SI. In such aspects, the device 115, the wireless audio device 130-*a*, and the wireless audio device 130-*b* may achieve a delay of approximately 1 TWT SI, which may span approximately 4 or 8 ms.

In accordance with receiving the updated parameters, the wireless audio device 130-*a* and the wireless audio device 130-*b* may each update respective codecs based on the updated parameters. In other words, an earbud may tie or synchronize any updates in parameters with a codec of the earbud. As such, the wireless audio device 130-*a* and the wireless audio device 130-*b* may accurately read or otherwise obtain data from a wireless channel in accordance with the updated parameters (e.g., the updated TWT parameters). Further, the wireless audio device 130-*a* and the wireless audio device 130-*b* may decode the indication of the updated parameters using a processor that is used generally for various tasks or using an application-specific processor, or using both. Additionally, by embedding an indication of the updated parameters in the RTP audio header, the various communicating devices may implement the described techniques at the application level, which may further reduce latency.

Figure 4:
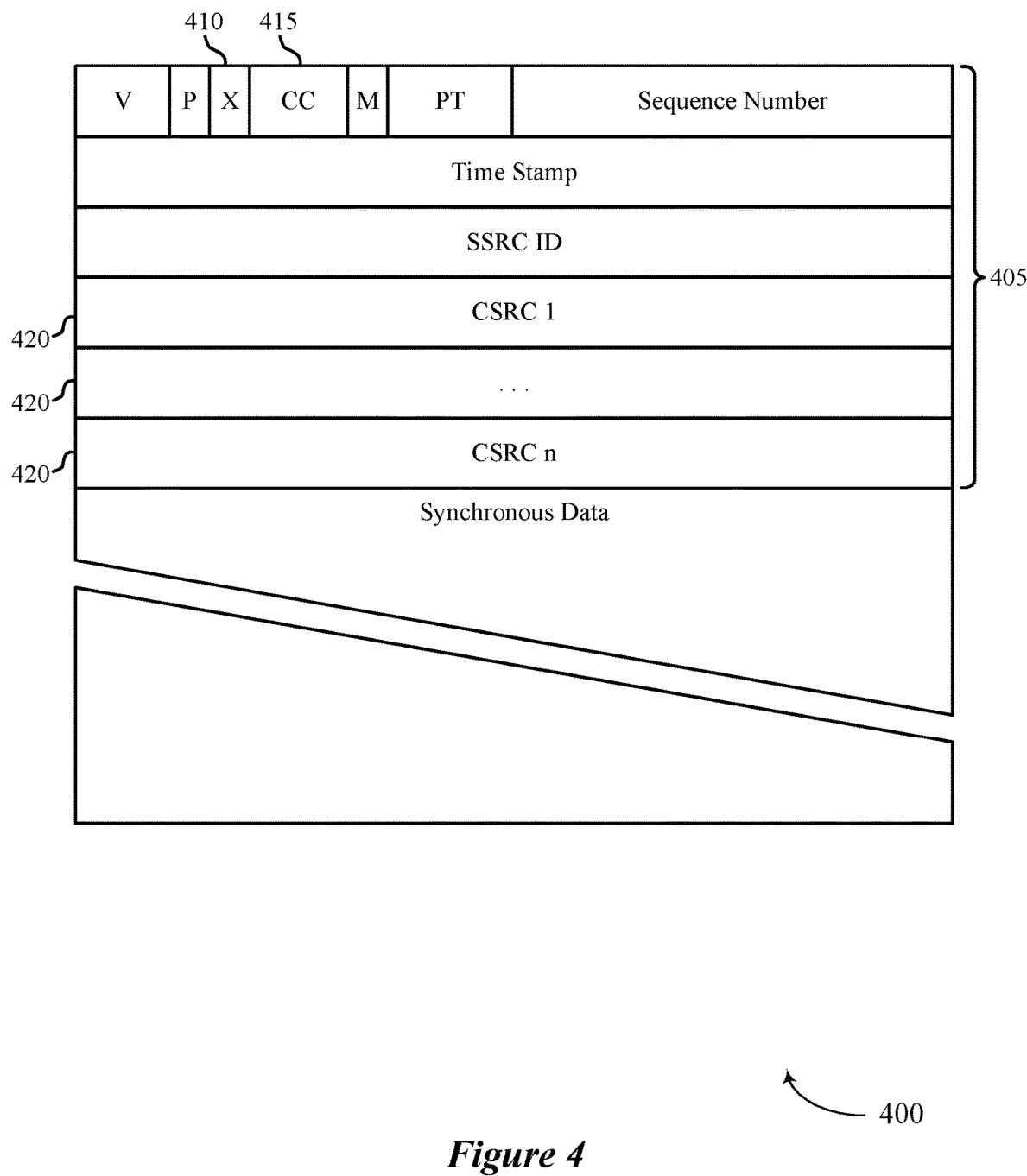
FIGS. 4 and 5 illustrate examples of audio data packets that support low-latency parameter updates for XPANs in accordance with one or more aspects of the present disclosure.

FIG. 4 illustrates an example of an audio data packet 400 that supports low-latency parameter updates for extended personal area networks in accordance with one or more aspects of the present disclosure. The audio data packet 400 may implement or be implemented to realize or facilitate aspects of the wireless communications system 100, the wireless communications system 200, or the process flow 300. For example, the audio data packet 400 illustrates an example of how a device 115 may embed a set of updated parameters in one or more audio data packets that the device 115 may transmit to a wireless audio device 130-*a* and a wireless audio device 130-*b*, where the device 115, the wireless audio device 130-*a*, and the wireless audio device 130-*b* may be examples of corresponding devices as illustrated by and described with reference to FIGS. 1-3.

The audio data packet 400 may include various portions and fields, including an RTP audio header 405 including an extension field 410, a CSRC count (CC) field 415, and a set of one or more CSRC fields 420. In some implementations, the device 115 may embed a set of parameters (e.g., a set of updated parameters, such as a set of updated TWT parameters) in one or more of the CSRC fields 420. In other words, the device 115, the wireless audio device 130-a, and the wireless audio device 130-b may use the CSRC fields 420 of the RTP audio header 405 to carry the updated parameters.

In such implementations, the device 115 may set a value of the extension field 410 to a first value (e.g., 1) to indicate that the audio data packet 400 includes CSRC fields (e.g., to indicate a presence of CSRC fields, which may be optional). The extension field 410 may be set to a second value (e.g., 0) by default, which may indicate an absence of any CSRC fields 420 in the audio data packet 400. The device 115 may further set a value of the CC field 415 to a quantity of CSRC fields 420 that are included in the audio data packet 400. For example, if the audio data packet 400 includes N CSRC fields, the device 115 may set the CC field 415 to a value of N. If there are no CSRC fields 420 included in the audio data packet 400, the device 115 may set the value of the CC field 415 to 0 by default. The CSRC fields 420 may be 32 bits wide (e.g., may be 32-bit fields) and the device 115 may include one or more parameters in the one or more CSRC fields 420.

Figure 5:
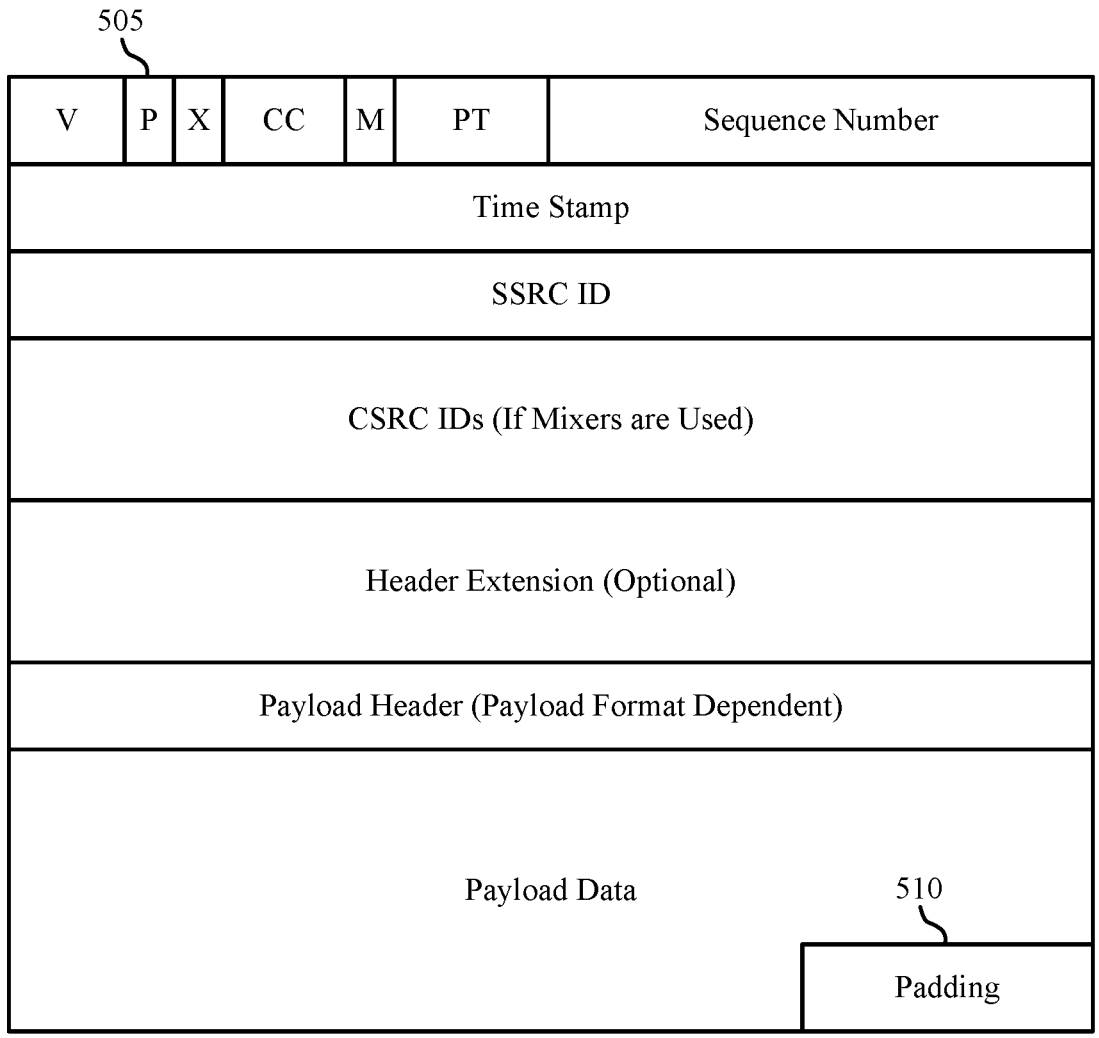

FIG. 5 illustrates an example of an audio data packet 500 that supports low-latency parameter updates for extended personal area networks in accordance with one or more aspects of the present disclosure. The audio data packet 500 may implement or be implemented to realize or facilitate aspects of the wireless communications system 100, the wireless communications system 200, the process flow 300, or the audio data packet 400. For example, the audio data packet 500 illustrates an example of how a device 115 may embed a set of updated parameters in one or more audio data packets that the device 115 may transmit to a wireless audio device 130-a and a wireless audio device 130-b, where the device 115, the wireless audio device 130-a, and the wireless audio device 130-b may be examples of corresponding devices as illustrated by and described with reference to FIGS. 1-4.

The audio data packet 500 may include various portions and fields, including a padding field 505 of an RTP audio header and a padding section 510 of a payload data portion. In some implementations, the device may embed a set of parameters (e.g., a set of updated parameters, such as a set of updated TWT parameters) in the padding section 510. In other words, the device 115, the wireless audio device 130-a, and the wireless audio device 130-b may use the padding section 510 of the RTP audio packet to carry the updated parameters.

In such implementations, the device 115 may set a value of the padding field 505 to a first value (e.g., 1) to indicate that the audio data packet 500 includes the padding section 510. The device 115 may embed one or more updated parameters in the padding section 510 and, in some implementations, a decoder of a receiving earbud may forward the payload and the padding section 510 to a Wi-Fi SS to extract the updated parameters that are embedded in the padding section 510 and indicates to the Wi-Fi SS that there is a padding section 510 to be parsed. In some implementations, embedding a set of parameters in a padding section 510 may be associated with relatively lower decoder complexity (and, likewise, lower decoding latency), as a decoder may refrain from parsing the CSRC fields in the middle of the RTP audio header.

Figure 6:
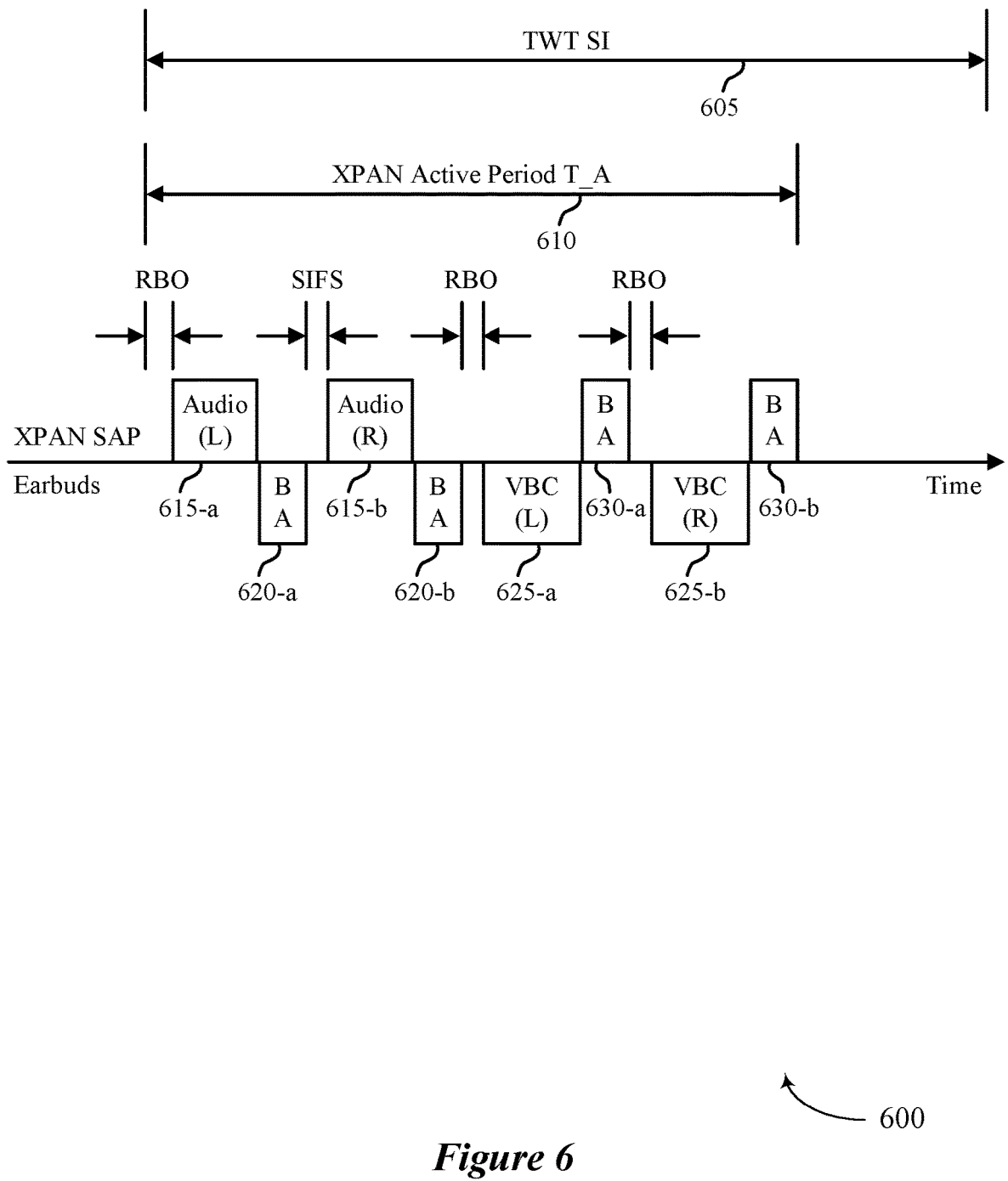
FIG. 6 illustrates an example of a communication timeline that supports low-latency parameter updates for XPANs in accordance with one or more aspects of the present disclosure.

FIG. 6 illustrates an example of a communication timeline 600 that supports low-latency parameter updates for extended personal area networks in accordance with one or more aspects of the present disclosure. The communication timeline 600 may implement or be implemented to realize or facilitate aspects of the wireless communications system 100, the wireless communications system 200, the process flow 300, the audio data packet 400, or the audio data packet 500. For example, a wireless device 115 (illustrated to function as an XPAN SAP in FIG. 6) and a wireless audio device 130-a and a wireless audio device 130-b (illustrated jointly as "earbuds" in FIG. 6) may communicate in accordance with the communication timeline 600, and the device 115, the wireless audio device 130-a, and the wireless audio device 130-b may be examples of corresponding devices as illustrated by and described with reference to FIGS. 1-5.

In some implementations, one or both of the wireless audio device 130-a and the wireless audio device 130-b may transmit an indication of a set of one or more parameters to the device 115. In other words, the described techniques may also be implemented to communicate parameters in the direction from the earbuds to the device 115 (e.g., a handset). In such implementations, one or both of the wireless audio device 130-a and the wireless audio device 130-b may transmit an indication of a set of parameters via one or more uplink voice back channel (VBC) messages. As described with reference to FIG. 6, the wireless audio device 130-a may be an example of a right earbud and the wireless audio device 130-b may be an example of a left earbud.

Further, the communication timeline 600 illustrates an example TWT SI 605 and an example XPAN active period 610 (which may be associated with a time duration equal to T A). In an example in which the TWT SI 605 is associated with a gaming TWT SI, the TWT SI 605 may be approximately 4 ms. In an example, the XPAN active period 610 may be associated with a time period between approximately 760.6 and approximately 1305.4 microseconds. Various frame exchanges illustrated by the communication timeline 600 may be separated by a short inter-frame spacing (SIFS) or a random backoff (RBO).

As illustrated by the communication timeline 600, the device 115 may transmit an audio message 615-a to a left earbud and may receive a BA 620-a from the left earbud responsive to the audio message 615-a. The device 115 may transmit an audio message 615-b to a right earbud and may receive a BA 620-b from the right earbud responsive to the audio message 615-b. In some implementations, one or both of the audio message 615-a and the audio message 615-b may include a set of updated parameters (e.g., a set of updated TWT or other XPAN-related parameters). Further, the left earbud may transmit a VBC message 625-a to the device 115 and may receive a BA 630-a from the device 115 responsive to the VBC message 625-a. In some implementations, the left earbud may embed a set of parameters (e.g., a set of updated parameters, such as a set of updated XPAN-related parameters) in the VBC message 625-a. Similarly, the right earbud may transmit a VBC message 625-b to the device 115 and may receive a BA 630-b from the device 115 responsive to the VBC message 625-b. In some implementations, the right earbud may embed a set of parameters (e.g., a set of updated parameters, such as a set of updated XPAN-related parameters) in the VBC message 625-b.

Figure 7:
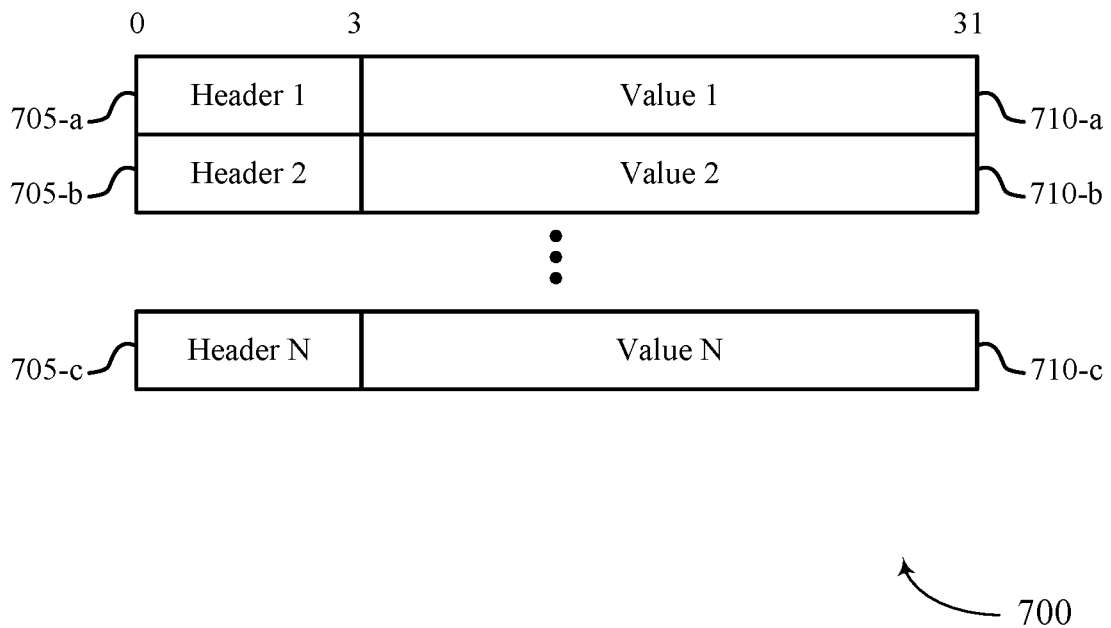
FIG. 7 illustrates examples of encoding formats that support low-latency parameter updates for XPANs in accordance with one or more aspects of the present disclosure.
Figure 7:
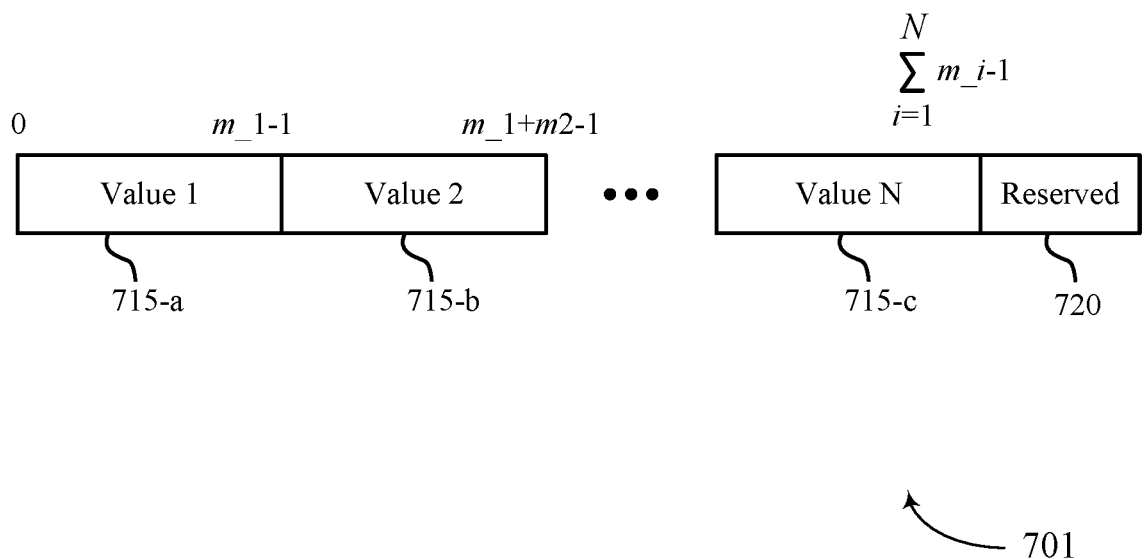

FIG. 7 illustrates examples of encoding formats 700 and 701 that support low-latency parameter updates for extended personal area networks in accordance with one or more aspects of the present disclosure. The encoding formats 700 and 701 may implement or be implemented to realize or facilitate aspects of the wireless communications system 100, the wireless communications system 200, the process flow 300, the audio data packet 400, the audio data packet 500, or the communication timeline 600. For example, a device 115 or an earbud (e.g., at least one of the wireless audio device 130-a and the wireless audio device 130-b) may encode a set of parameters (e.g., a set of updated parameters, such as a set of updated XPAN-related parameters) in accordance with one or both of the encoding formats 700 and 701 and the other of the device 115 or the earbud may decode, process, or extract the set of parameters in accordance with the encoding formats 700 and 701. In other words, the device 115 may use one or both of the encoding formats 700 and 701 to embed a set of updated parameters in an audio data packet. One or both of the wireless audio device 130-a and the wireless audio device 130-b may additionally, or alternatively, use one or both of the encoding formats 700 and 701 to embed a set of updated parameters in an uplink VBC message.

In some implementations, the device 115, the wireless audio device 130-a, and the wireless audio device 130-b may support one or more protocols according to which the device 115, the wireless audio device 130-a, and the wireless audio device 130-b may communicate multiple pieces of information (e.g., multiple parameters) in a mutually understood way (and in a way that is non-interfering to other devices). In some implementations, the one or more protocols supported by the device 115, the wireless audio device 130-a, and the wireless audio device 130-b may be product- or manufacturer-specific.

In some implementations, and as illustrated by the encoding format 700, the device 115, the wireless audio device 130-a, and the wireless audio device 130-b may support a protocol relating to field header and field value format for conveying different types of information. In such implementations, an encoding device may use a first bit-length header (e.g., a 4-bit header) and a second bit-length value (e.g., a 28-bit value) to allow an indication for up to some quantity (e.g., 16) of different types of information (e.g., different parameters) that can be communicated between the device 115 and each of the wireless audio device 130-a and the wireless audio device 130-b. In examples in which the first bit-length header and the second bit-length value add up to 32 bits, an encoding device may align a given parameter indication with the 32-bit boundary of a CSRC field for relatively easier parsing, decoding, or extraction at the receive side. Such a format may be referred to as a header-value communication technique. Another option to the header-value communication technique may be a header (or type)-length-value. This may allow a device the flexibility of communicating (e.g., generating and transmitting) fields of different lengths instead of, or in addition to, using a fixed "second bit-length" value.

As illustrated by the encoding format 700, a header field 705-a may indicate a first type of information or parameter and a value field 710-a may indicate a value for the first type of information or parameter. Similarly, a header field 705-b may indicate a second type of information or parameter, a value field 710-b may indicate a value for the second type of information or parameter, a header field 705-c may indicate a third type of information or parameter, and a value field 710-c may indicate a value for the third type of information or parameter. In an example, a header field value of 0000 may indicate a TWT SI parameter (having an indicated value of "xxxx"), a header field value of 0001 may indicate a TWT SP parameter (having an indicated value of "yyyy"), a header field value of 0010 may indicate a TWT start time parameter (having an indicated value of "zzzz"), a header field value of 0011 may indicate a handset RSSI parameter (having an indicated value of "aaaa"), and so on for any other XPAN-related parameters that may be communicated via an audio data packet.

Additionally, or alternatively, and as illustrated by the encoding format 701, the device 115, the wireless audio device 130-a, and the wireless audio device 130-b may support an implicit or agreed upon ordering of types of information or parameters. For example, instead of explicitly indicating header fields, the device 115, the wireless audio device 130-a, and the wireless audio device 130-b may directly communicate a set of one or more values in accordance with an order that is agreed upon between the device 115, the wireless audio device 130-a, and the wireless audio device 130-b. Such an order may be associated with a mapping that indicates an order in which values for different parameters are provided and, in some implementations, the mapping may indicate a bit-width for each of the different parameters. For example, the mapping may indicate an order of a value field 715-a followed by a value field 715-b, followed by a value field 715-c and may indicate a quantity of bits for each value field (e.g., a quantity of m 1 bits for the value field 715-a, a quantity of m 2 bits for the value field 715-b, and so on such that a last bit of a sequence of N value fields is the $\Sigma_{i=1}^{N} m_i - 1$ bit. In accordance with the encoding format 701, the communicating devices may include a set of reserved bits 720 following the value fields 715.

As such, the encoding format 701 may satisfy one or more relatively higher resource efficiency thresholds, especially in scenarios in which the different values that may be communicated have different ranges or resolutions. In an example, a first value indicated by a first ordered value field 715 may correspond to a TWT SI mantissa (and may include 16 bits), a second value indicated by a second ordered value field 715 may correspond to a TWT SI exponent (and may include 5 bits), a third value indicated by a third ordered value field 715 may correspond to a TWT SP (and may include 8 bits), a fourth value indicated by a fourth ordered value field 715 may correspond to a TWT start time (and may include 8 bits), a fifth value indicated by a fifth ordered value field 715 may correspond to an RSSI value (and may include 16 bits), and so on for any other XPAN-related parameters.

Figure 8:
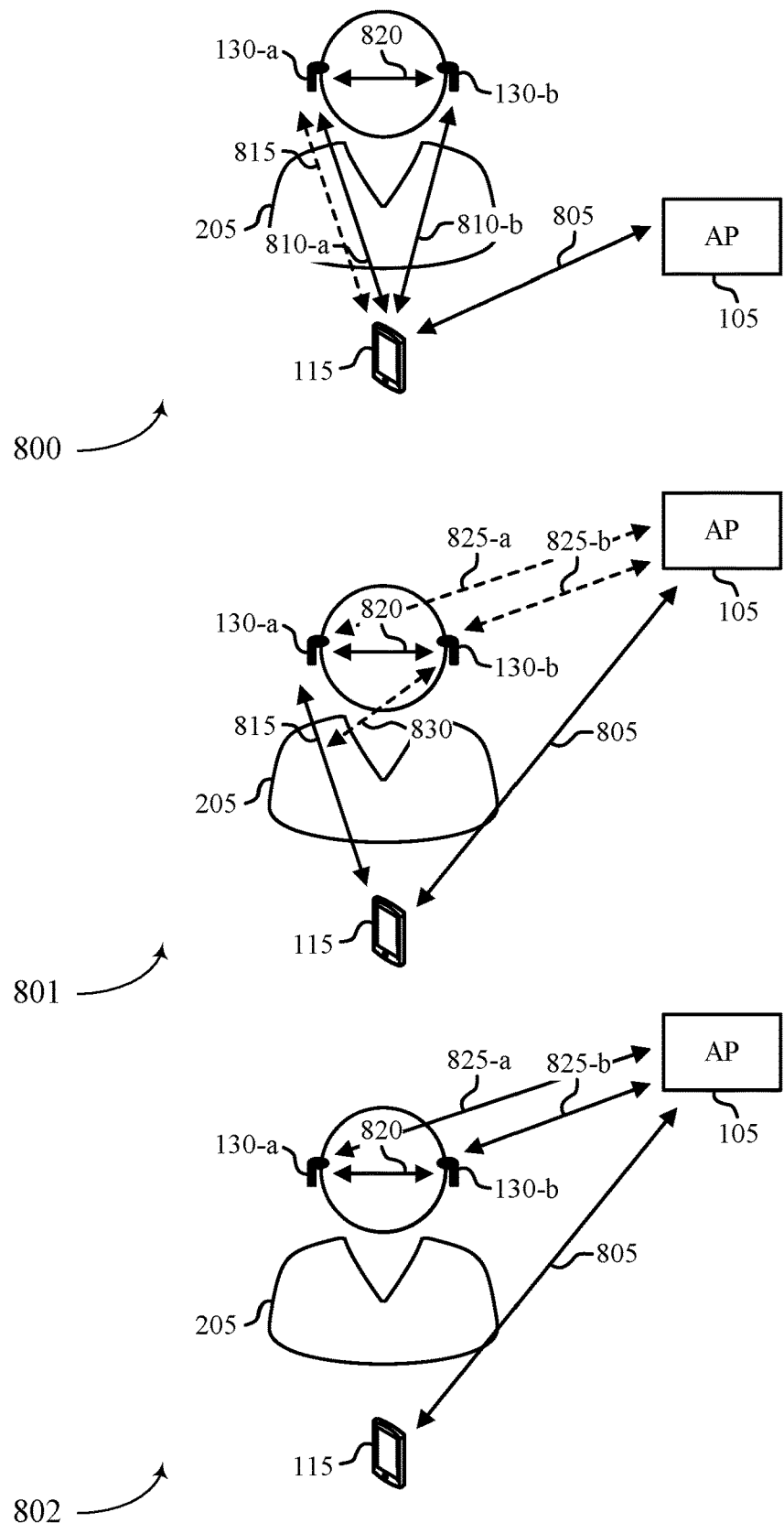
FIGS. 8 through 10 illustrate examples of XPAN topologies that supports low-latency parameter updates for XPANs in accordance with one or more aspects of the present disclosure.

FIG. 8 illustrates examples of XPAN topologies 800, 801, and 802 that support low-latency parameter updates for extended personal area networks in accordance with one or more aspects of the present disclosure. The XPAN topologies 800, 801, and 802 may implement or be implemented to realize or facilitate aspects of the wireless communications system 100, the wireless communications system 200, the process flow 300, the audio data packet 400, the audio data packet 500, the communication timeline 600, the encoding format 700, or the encoding format 701. For example, each of the XPAN topologies 800, 801, and 802 illustrate example deployment scenarios of an AP 105, a device 115, a wireless audio device 130-a, and a wireless audio device 130-b, which may be examples of corresponding devices as illustrated by and described with reference to FIGS. 1-7.

In some implementations, one or both of the device 115 and the AP 105 and each of the wireless audio device 130-a and the wireless audio device 130-b may support a signaling-based mechanism according to which the device 115 or the AP 105 may transmit an indication of a set of parameters (e.g., a set of updated XPAN parameters, such as a set of updated TWT parameters) to each of the wireless audio device 130-a and the wireless audio device 130-b via one or more audio data packets. In other words, although described herein in the context of the device 115 communicating a set of updated parameters with the wireless audio device 130-*a* and the wireless audio device 130-*b* via audio data packets or VBC messages, an AP 105 may perform similar functions and transmit similar signaling as the device 115 to facilitate low-latency parameter updates in some deployment scenarios.

In other words, and as illustrated by and described with reference to each of FIGS. 8-10, the described techniques may apply for any topology in which a TWT is used for communication with a set or pair of earbuds, including topologies in which the XPAN is between a handset and the earbuds or between an infrastructure AP and the earbuds. For ULL gaming use cases, in particular, a tight latency constraint may expect an agile technique for TWT parameters update. Thus, the described techniques may support solutions for TWT parameter updates between earbuds and either or both of a handset (e.g., a phone) or an AP in XPAN use cases.

As illustrated by the XPAN topology 800, the AP 105 may communicate with the device 115 via a link 805 and the device 115 may communicate with the wireless audio device 130-*a* and the wireless audio device 130-*b* via a link 810-*a* and a link 810-*b*, respectively. The link 805 may be an example of a 2.4 GHz link and the link 810-*a* and the link 810-*b* may be examples of 5 GHz links. The device 115 may also communicate with the wireless audio device 130-*a* via a link 815, which may be an example of a Bluetooth link. The wireless audio device 130-*a* and the wireless audio device 130-*b* may communicate with each other via a link 820, which may be an example of a Bluetooth link. The link 810-*a* and the link 810-*b* may be examples of XPAN links and the XPAN topology 800 may be an example of an XPAN direct link.

As illustrated by the XPAN topology 801, the AP 105 may communicate with the device 115 via the link 805 and the AP 105 may communicate with the wireless audio device 130-*a* and the wireless audio device 130-*b* via a link 825-*a* and a link 825-*b*, respectively. The link 805, the link 825-*a*, and the link 825-*b* may be examples of 5 GHz links. The device 115 may communicate with the wireless audio device 130-*a* via a link 815, which may be an example of a Bluetooth link. The wireless audio device 130-*a* and the wireless audio device 130-*b* may communicate with each other via the link 820, which may be an example of a Bluetooth link. In some examples, the wireless audio device 130-*b* may support a mirroring technology and may attempt to "sniff" packets sent via the link 815 via a mirroring link 830. The link 805, the link 825-*a*, and the link 825-*b* may be examples of XPAN links and the XPAN topology 801 may be an example of an XPAN infrastructure link on standby.

As illustrated by the XPAN topology 802, the AP 105 may communicate with the device 115 via the link 805 and the AP 105 may communicate with the wireless audio device 130-*a* and the wireless audio device 130-*b* via the link 825-*a* and the link 825-*b*, respectively. The link 805, the link 825-*a*, and the link 825-*b* may be examples of 5 GHz links. The wireless audio device 130-*a* and the wireless audio device 130-*b* may communicate with each other via the link 820, which may be an example of a Bluetooth link. The device 115 may lack a direct link between the device 115 and the earbuds. Instead, the AP 105 may control the system or relay packets and messages between the earbuds and the device 115. The link 805, the link 825-*a*, and the link 825-*b* may be examples of XPAN links and the XPAN topology 802 may be an example of an XPAN infrastructure deployment.

Figure 9:
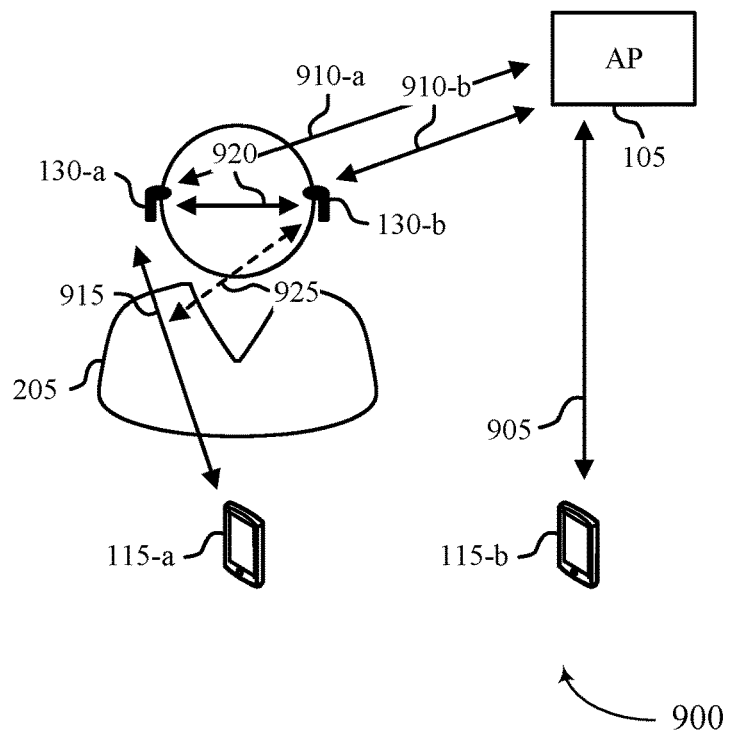
Figure 9:
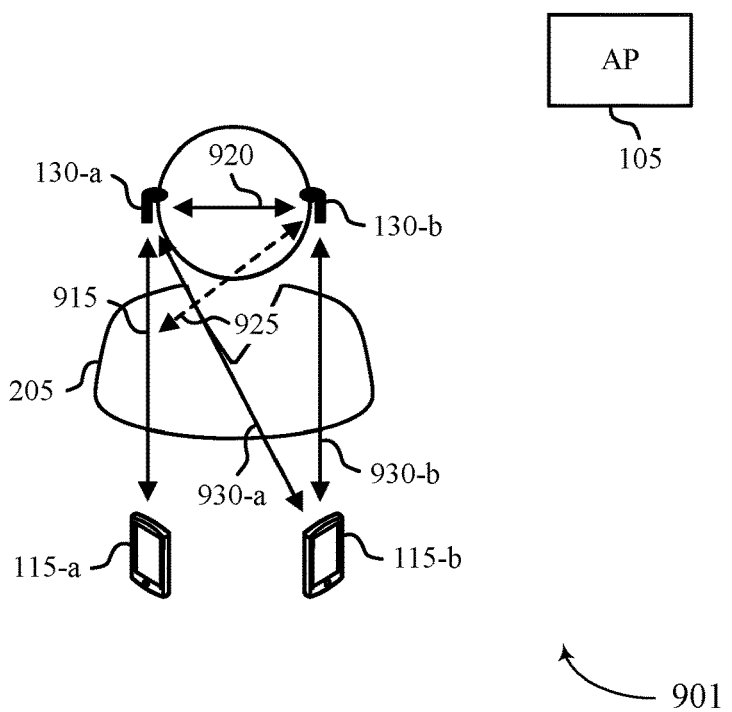

FIG. 9 illustrates examples of XPAN topologies 900 and 901 that support low-latency parameter updates for extended personal area networks in accordance with one or more aspects of the present disclosure. The XPAN topologies 900 and 901 may implement or be implemented to realize or facilitate aspects of the wireless communications system 100, the wireless communications system 200, the process flow 300, the audio data packet 400, the audio data packet 500, the communication timeline 600, the encoding format 700, or the encoding format 701. For example, each of the XPAN topologies 900 and 901 illustrate example deployment scenarios of an AP 105, a device 115-*a*, a device 115-*b*, a wireless audio device 130-*a*, and a wireless audio device 130-*b*, which may be examples of corresponding devices as illustrated by and described with reference to FIGS. 1-7.

In some implementations, any one or more of the device 115-*a*, the device 115-*b*, and the AP 105 and each of the wireless audio device 130-*a* and the wireless audio device 130-*b* may support a signaling-based mechanism according to which the device 115-*a*, the device 115-*b*, or the AP 105 may transmit an indication of a set of parameters (e.g., a set of updated XPAN parameters, such as a set of updated TWT parameters) to each of the wireless audio device 130-*a* and the wireless audio device 130-*b* via one or more audio data packets. In other words, although described herein in the context of a single device 115 communicating a set of updated parameters with the wireless audio device 130-*a* and the wireless audio device 130-*b* via audio data packets or VBC messages, an AP 105 or multiple devices 115 may perform similar functions and transmit similar signaling as a single device 115 to facilitate low-latency parameter updates in some deployment scenarios.

As illustrated by the XPAN topology 900, the AP 105 may communicate with the device 115-*b* via a link 905 and the AP 105 may communicate with the wireless audio device 130-*a* and the wireless audio device 130-*b* via a link 910-*a* and a link 910-*b*, respectively. The link 905, the link 910-*a*, and the link 910-*b* may be examples of 5 GHz links. The device 115-*a* may communicate with the wireless audio device 130-*a* via a link 915, which may be an example of a Bluetooth link. The wireless audio device 130-*a* and the wireless audio device 130-*b* may communicate with each other via the link 920, which may be an example of a Bluetooth link. In some examples, the wireless audio device 130-*b* may support a mirroring technology and may attempt to "sniff" packets sent via the link 815 via a mirroring link 925. The link 905, the link 910-*a*, and the link 910-*b* may be examples of XPAN links and the XPAN topology 900 may be an example of a Bluetooth+XPAN (infrastructure) dual link.

As illustrated by the XPAN topology 901, the AP 105 may lack a connection to other devices. In such examples, the device 115-*a* may communicate with the wireless audio device 130-*a* via the link 915 and the wireless audio device 130-*a* and the wireless audio device 130-*b* may communicate with each other via the link 920, where each of the link 915 and the link 920 may be examples of Bluetooth links. In some examples, the wireless audio device 130-*b* may support a mirroring technology and may attempt to "sniff" packets sent via the link 815 via a mirroring link 925. The device 115-*b* may communicate with the wireless audio device 130-*a* and the wireless audio device 130-*b* via a link 930-*a* and a link 930-*b*, respectively. The link 930-*a* and the link 930-*b* may be examples of 5 GHz links. The link 930-*a* and the link 930-*b* may be examples of XPAN links and the XPAN topology 901 may be an example of a Bluetooth+XPAN (direct) dual link.

Figure 10:
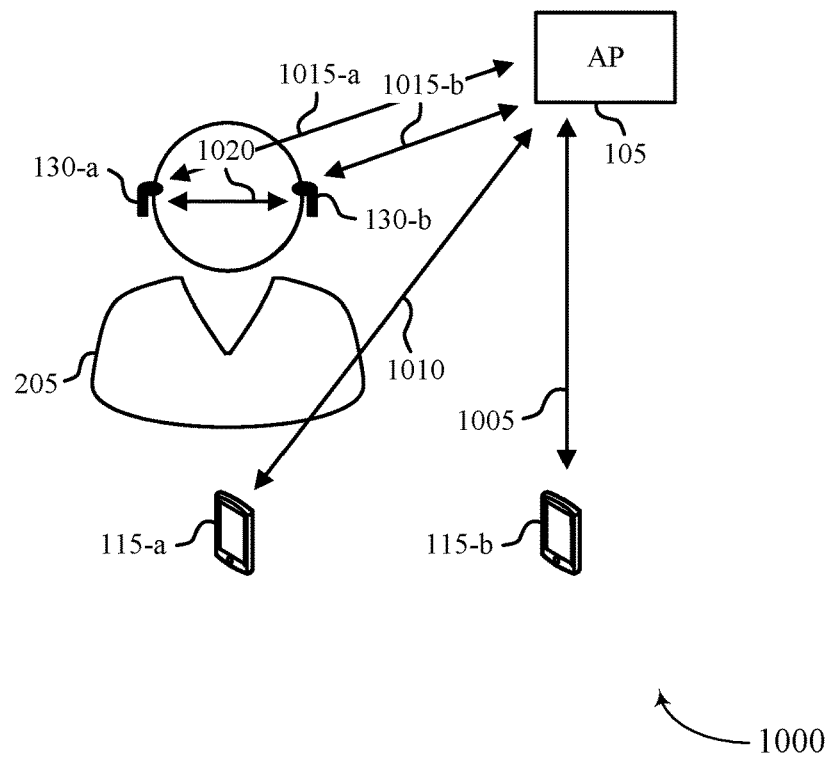
Figure 10:
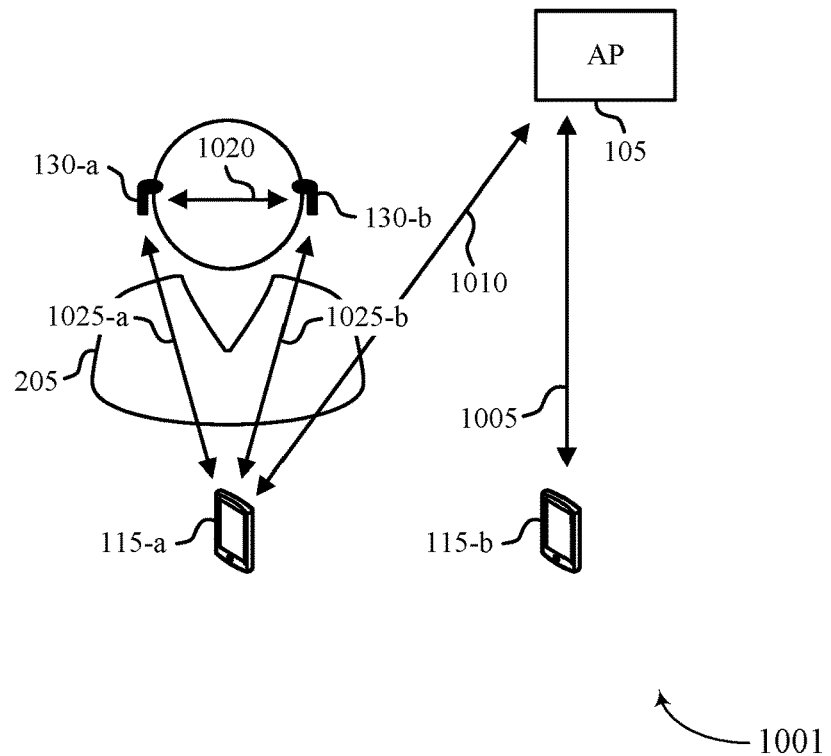

FIG. 10 illustrates examples of XPAN topologies 1000 and 1001 that support low-latency parameter updates for extended personal area networks in accordance with one or more aspects of the present disclosure. The XPAN topologies 1000 and 1001 may implement or be implemented to realize or facilitate aspects of the wireless communications system 100, the wireless communications system 200, the process flow 300, the audio data packet 400, the audio data packet 500, the communication timeline 600, the encoding format 700, or the encoding format 701. For example, each of the XPAN topologies 1000 and 1001 illustrate example deployment scenarios of an AP 105, a device 115-*a*, a device 115-*b*, a wireless audio device 130-*a*, and a wireless audio device 130-*b*, which may be examples of corresponding devices as illustrated by and described with reference to FIGS. 1-7.

In some implementations, any one or more of the device 115-*a*, the device 115-*b*, and the AP 105 and each of the wireless audio device 130-*a* and the wireless audio device 130-*b* may support a signaling-based mechanism according to which the device 115-*a*, the device 115-*b*, or the AP 105 may transmit an indication of a set of parameters (e.g., a set of updated XPAN parameters, such as a set of updated TWT parameters) to each of the wireless audio device 130-*a* and the wireless audio device 130-*b* via one or more audio data packets. In other words, although described herein in the context of a single device 115 communicating a set of updated parameters with the wireless audio device 130-*a* and the wireless audio device 130-*b* via audio data packets or VBC messages, an AP 105 or multiple devices 115 may perform similar functions and transmit similar signaling as a single device 115 to facilitate low-latency parameter updates in some deployment scenarios.

As illustrated by the XPAN topology 1000, the AP 105 may communicate with the device 115-*b* via a link 1005 and may communicate with the device 115-*a* via a link 1010. The link 1005 and the link 1010 may be examples of 5 GHz links. The AP 105 may also communicate with the wireless audio device 130-*a* and the wireless audio device 130-*b* via a link 1015-*a* and a link 1015-*b*, respectively. The link 1015-*a* and the link 1015-*b* may be examples of 5 GHz links. The wireless audio device 130-*a* and the wireless audio device 130-*b* may communicate with each other via a link 1020, which may be an example of a Bluetooth link. The link 1005, the link 1010, the link 1015-*a*, and the link 1015-*b* may be examples of XPAN links and the XPAN topology 1000 may be an example of an XPAN+XPAN dual link.

As illustrated by the XPAN topology 1001, the AP 105 may communicate with the device 115-*b* via the link 1005 and may communicate with the device 115-*a* via the link 1010. The link 1005 and the link 1010 may be examples of 5 GHz links. The device 115-*a* may communicate with the wireless audio device 130-*a* and the wireless audio device 130-*b* via a link 1025-*a* and a link 1025-*b*, respectively. The link 1025-*a* and the link 1025-*b* may be examples of 5 GHz links. The wireless audio device 130-*a* and the wireless audio device 130-*b* may communicate with each other via the link 1020, which may be an example of a Bluetooth link. The link 1005, the link 1010, the link 1025-*a*, and the link 1025-*b* may be examples of XPAN links and the XPAN topology 1001 may be an example of an XPAN direct dual link.

Figure 11:
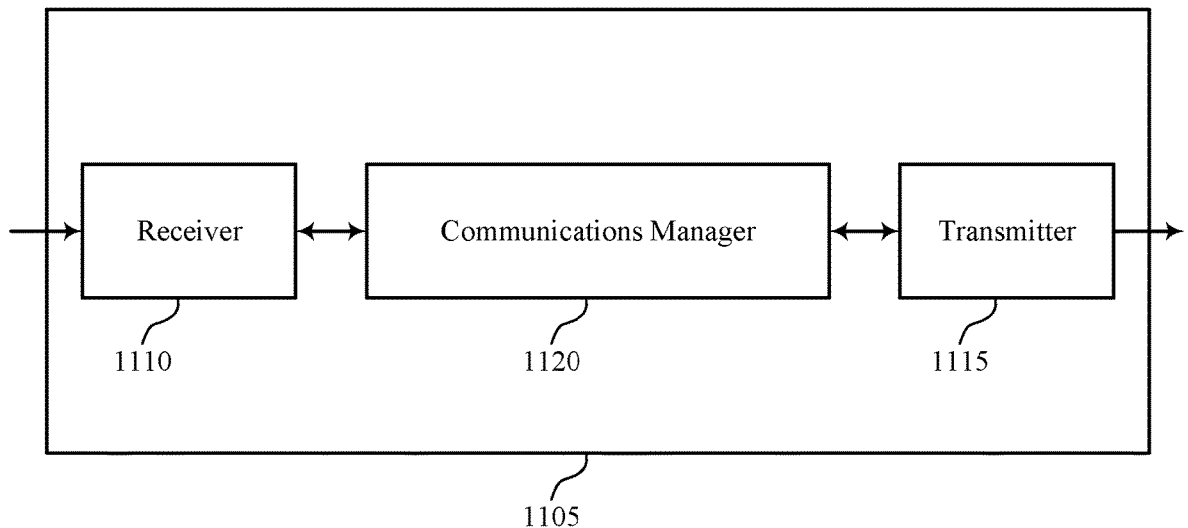
FIGS. 11 and 12 show block diagrams of devices that support low-latency parameter updates for XPANs in accordance with one or more aspects of the present disclosure.

FIG. 11 shows a block diagram 1100 of a device 1105 that supports low-latency parameter updates for extended personal area networks in accordance with one or more aspects of the present disclosure. The device 1105 may be an example of aspects of an AP as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to low-latency parameter updates for extended personal area networks). Information may be passed on to other components of the device 1105. The receiver 1110 may utilize a single antenna or a set of multiple antennas.

The transmitter 1115 may provide a means for transmitting signals generated by other components of the device 1105. The transmitter 1115 may utilize a single antenna or a set of multiple antennas.

The communications manager 1120, the receiver 1110, the transmitter 1115, or various combinations thereof or various components thereof may be examples of means for performing various aspects of low-latency parameter updates for extended personal area networks as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a wireless communication device in accordance with examples as disclosed herein. For example, the communications manager 1120 may be configured as or otherwise support a means for transmitting, to a first wireless audio device via a first audio data packet and to a second wireless audio device via a second audio data packet, an indication of a set of updated parameters associated with a wireless network (e.g., an extended personal area or audio network). The communications manager 1120 may be configured as or otherwise support a means for receiving a first feedback message from the first wireless audio device and a second feedback message from the second wireless audio device responsive to the first audio data packet and the second audio data packet, respectively. The communications manager 1120 may be configured as or otherwise support a means for transmitting, to one or both of the first wireless audio device and the second wireless audio device, a set of audio data packets in accordance with the set of updated parameters associated with the wireless network and based on receiving the first feedback message and the second feedback message.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for reduced processing, reduced power consumption, and more efficient utilization of communication resources.

Figure 12:
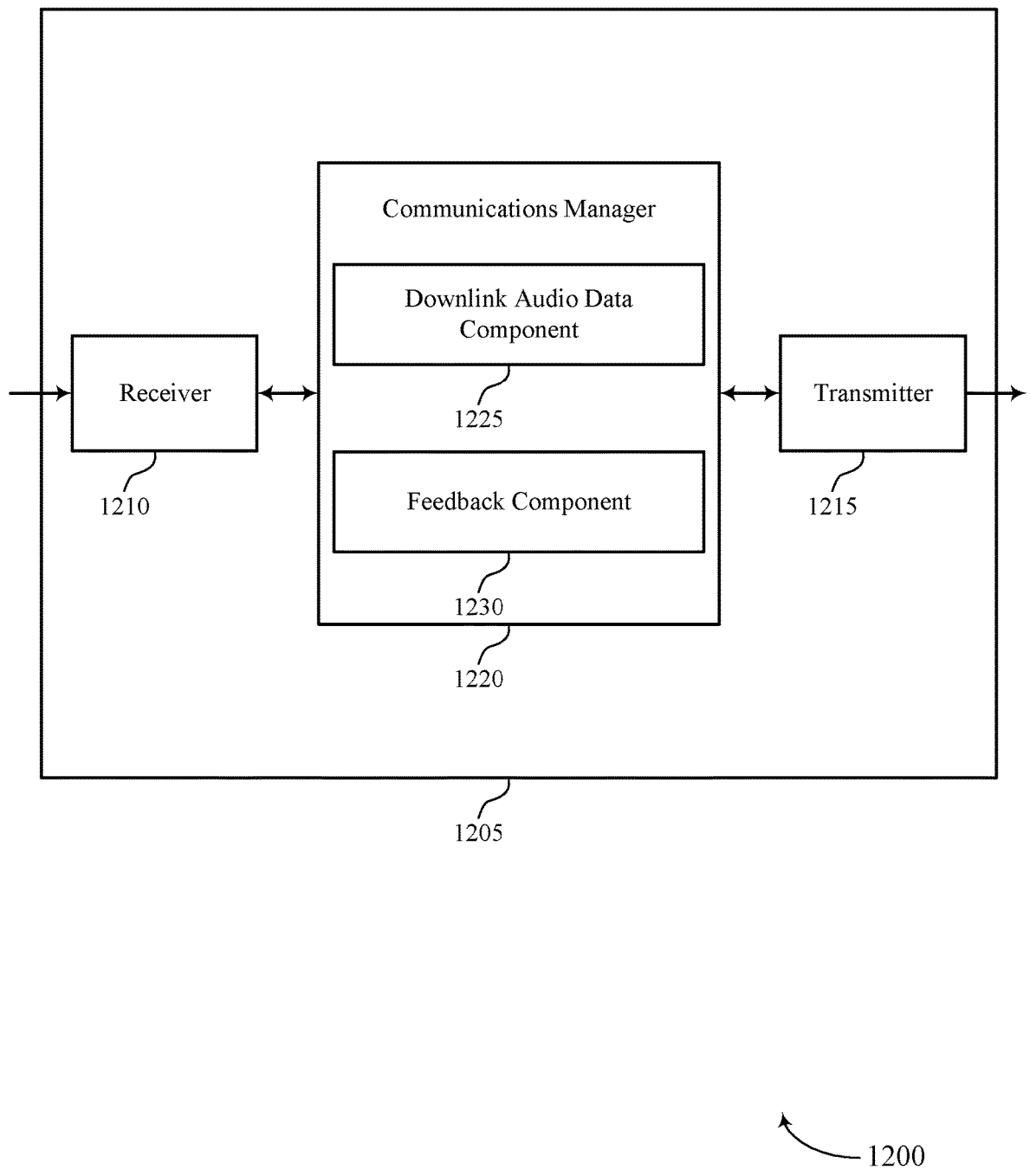

FIG. 12 shows a block diagram 1200 of a device 1205 that supports low-latency parameter updates for extended personal area networks in accordance with one or more aspects of the present disclosure. The device 1205 may be an example of aspects of a device 1105, an AP 105, a soft AP 105, or a device 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to low-latency parameter updates for extended personal area networks). Information may be passed on to other components of the device 1205. The receiver 1210 may utilize a single antenna or a set of multiple antennas.

The transmitter 1215 may provide a means for transmitting signals generated by other components of the device 1205. The transmitter 1215 may utilize a single antenna or a set of multiple antennas.

The device 1205, or various components thereof, may be an example of means for performing various aspects of low-latency parameter updates for extended personal area networks as described herein. For example, the communications manager 1220 may include a downlink audio data component 1225 a feedback component 1230, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a wireless communication device in accordance with examples as disclosed herein. The downlink audio data component 1225 may be configured as or otherwise support a means for transmitting, to a first wireless audio device via a first audio data packet and to a second wireless audio device via a second audio data packet, an indication of a set of updated parameters associated with a wireless network (e.g., an extended personal area or audio network). The feedback component 1230 may be configured as or otherwise support a means for receiving a first feedback message from the first wireless audio device and a second feedback message from the second wireless audio device responsive to the first audio data packet and the second audio data packet, respectively. The downlink audio data component 1225 may be configured as or otherwise support a means for transmitting, to one or both of the first wireless audio device and the second wireless audio device, a set of audio data packets in accordance with the set of updated parameters associated with the wireless network and based on receiving the first feedback message and the second feedback message.

Figure 13:
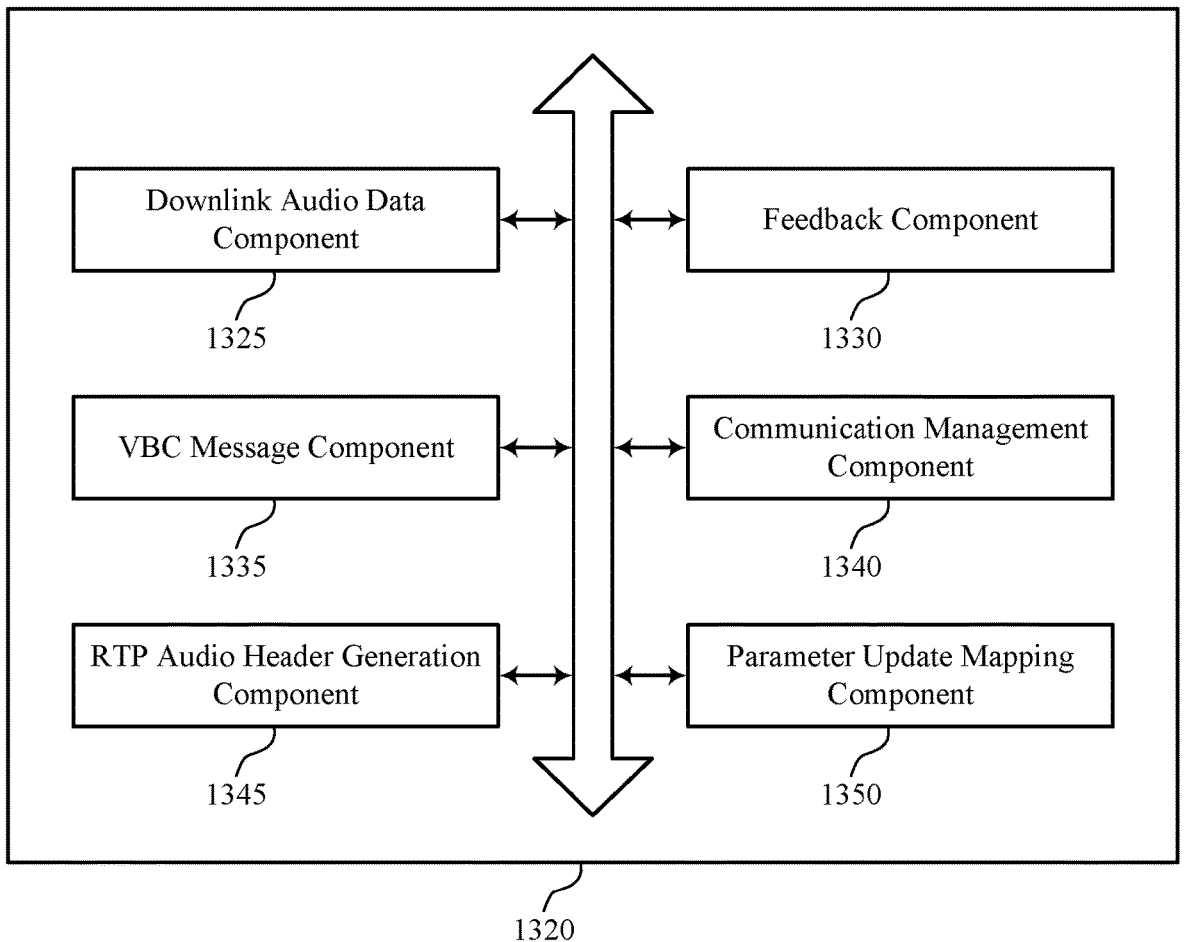
FIG. 13 shows a block diagram of a communications manager that supports low-latency parameter updates for XPANs in accordance with one or more aspects of the present disclosure.

FIG. 13 shows a block diagram 1300 of a communications manager 1320 that supports low-latency parameter updates for extended personal area networks in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of low-latency parameter updates for extended personal area networks as described herein. For example, the communications manager 1320 may include a downlink audio data component 1325, a feedback component 1330, a VBC message component 1335, a communication management component 1340, an RTP audio header generation component 1345, a parameter update mapping component 1350, or any combination thereof. Each of these components may communicate, directly or indirectly, with one another (e.g., via one or more buses).

The communications manager 1320 may support wireless communication at a wireless communication device in accordance with examples as disclosed herein. The downlink audio data component 1325 may be configured as or otherwise support a means for transmitting, to a first wireless audio device via a first audio data packet and to a second wireless audio device via a second audio data packet, an indication of a set of updated parameters associated with a wireless network (e.g., an extended personal area or audio network). The feedback component 1330 may be configured as or otherwise support a means for receiving a first feedback message from the first wireless audio device and a second feedback message from the second wireless audio device responsive to the first audio data packet and the second audio data packet, respectively. In some examples, the downlink audio data component 1325 may be configured as or otherwise support a means for transmitting, to one or both of the first wireless audio device and the second wireless audio device, a set of audio data packets in accordance with the set of updated parameters associated with the wireless network and based on receiving the first feedback message and the second feedback message.

In some examples, to support transmitting the indication of the set of updated parameters associated with the wireless network, the downlink audio data component 1325 may be configured as or otherwise support a means for transmitting the indication of the set of updated parameters via one or more fields of a real-time transport protocol audio header of each of the first audio data packet and the second audio data packet.

In some examples, the RTP audio header generation component 1345 may be configured as or otherwise support a means for setting an extension field of the real-time transport protocol audio header to a first value to indicate a presence of the indication of the set of updated parameters in the one or more fields of the real-time transport protocol audio header, where a second value of the extension field indicates an absence of the indication of the set of updated parameters from the one or more fields of the real-time transport protocol audio header. In some examples, the RTP audio header generation component 1345 may be configured as or otherwise support a means for setting a count field of the real-time transport protocol audio header to a value associated with a quantity of the one or more fields of the real-time transport protocol audio header that include the indication of the set of updated parameters.

In some examples, the one or more fields that include the indication of the set of updated parameters are a set of one or more contributing source fields of the real-time transport protocol audio header.

In some examples, to support transmitting the indication of the set of updated parameters associated with the wireless network, the downlink audio data component 1325 may be configured as or otherwise support a means for transmitting the indication of the set of updated parameters via a padding section of each of the first audio data packet and the second audio data packet.

In some examples, the RTP audio header generation component 1345 may be configured as or otherwise support a means for setting a padding field of a real-time transport protocol audio header of each of the first audio data packet and the second audio data packet to a first value to indicate a presence of the indication of the set of updated parameters in the padding section of the first audio data packet and the second audio data packet, respectively, where a second value of the padding field indicates an absence of the indication of the set of updated parameters from the padding section.

In some examples, the VBC message component 1335 may be configured as or otherwise support a means for receiving, from one or both of the first wireless audio device and the second wireless audio device, one or more voice back channel messages including an indication of a second set of updated parameters associated with the wireless network. In some examples, the downlink audio data component 1325 may be configured as or otherwise support a means for transmitting, to one or both of the first wireless audio device and the second wireless audio device, a second set of audio data packets in accordance with the second set of updated parameters.

In some examples, the communication management component 1340 may be configured as or otherwise support a means for detecting a change in channel conditions between the wireless communication device and at least one of the first wireless audio device and the second wireless audio device or a change in other concurrent communications involving the wireless communication device. In some examples, the downlink audio data component 1325 may be configured as or otherwise support a means for embedding the indication of the set of updated parameters in the first audio data packet and the second audio data packet based on detecting the change.

In some examples, the indication of the set of updated parameters are conveyed via one or more sets of bits of the first audio data packet and the second audio data packet. In some examples, each set of bits of the one or more sets of bits includes a first bit-length header and a second bit-length value. In some examples, the first bit-length header indicates an updated parameter of the set of updated parameters. In some examples, the second bit-length value indicates a value for the updated parameter.

In some examples, the indication of the set of updated parameters are conveyed via one or more sets of bits of the first audio data packet and the second audio data packet. In some examples, each set of bits of the one or more sets of bits indicates a value for an updated parameter of the set of updated parameters. In some examples, each set of bits of the one or more sets of bits corresponds to a respective updated parameter of the set of updated parameters in accordance with a mapping.

In some examples, the parameter update mapping component 1350 may be configured as or otherwise support a means for transmitting, to the first wireless audio device and the second wireless audio device, an indication of the mapping, where the mapping indicates a quantity of bits for each of the one or more sets of bits and an order for the one or more sets of bits in the first audio data packet and the second audio data packet.

In some examples, the first audio data packet and the second audio data packet are transmitted during a first target wake time service interval. In some examples, the set of audio data packets are transmitted during a second target wake time service interval that is immediately consecutive to the first target wake time service interval.

In some examples, the set of updated parameters associated with the wireless network includes a set of one or more target wake time parameters, a measured receive signal strength indicator, a channel switch indication, or a switch from an extended personal area network bearer to a Bluetooth bearer, or any combination thereof.

In some examples, the wireless communication device is a wireless handset or an access point. In some examples, the first audio data packet is transmitted to the first wireless audio device via a first wireless fidelity (Wi-Fi) link between the wireless communication device and the first wireless audio device and the second audio data packet is transmitted to the second wireless audio device via a second Wi-Fi link between the wireless communication device and the second wireless audio device.

Figure 14:
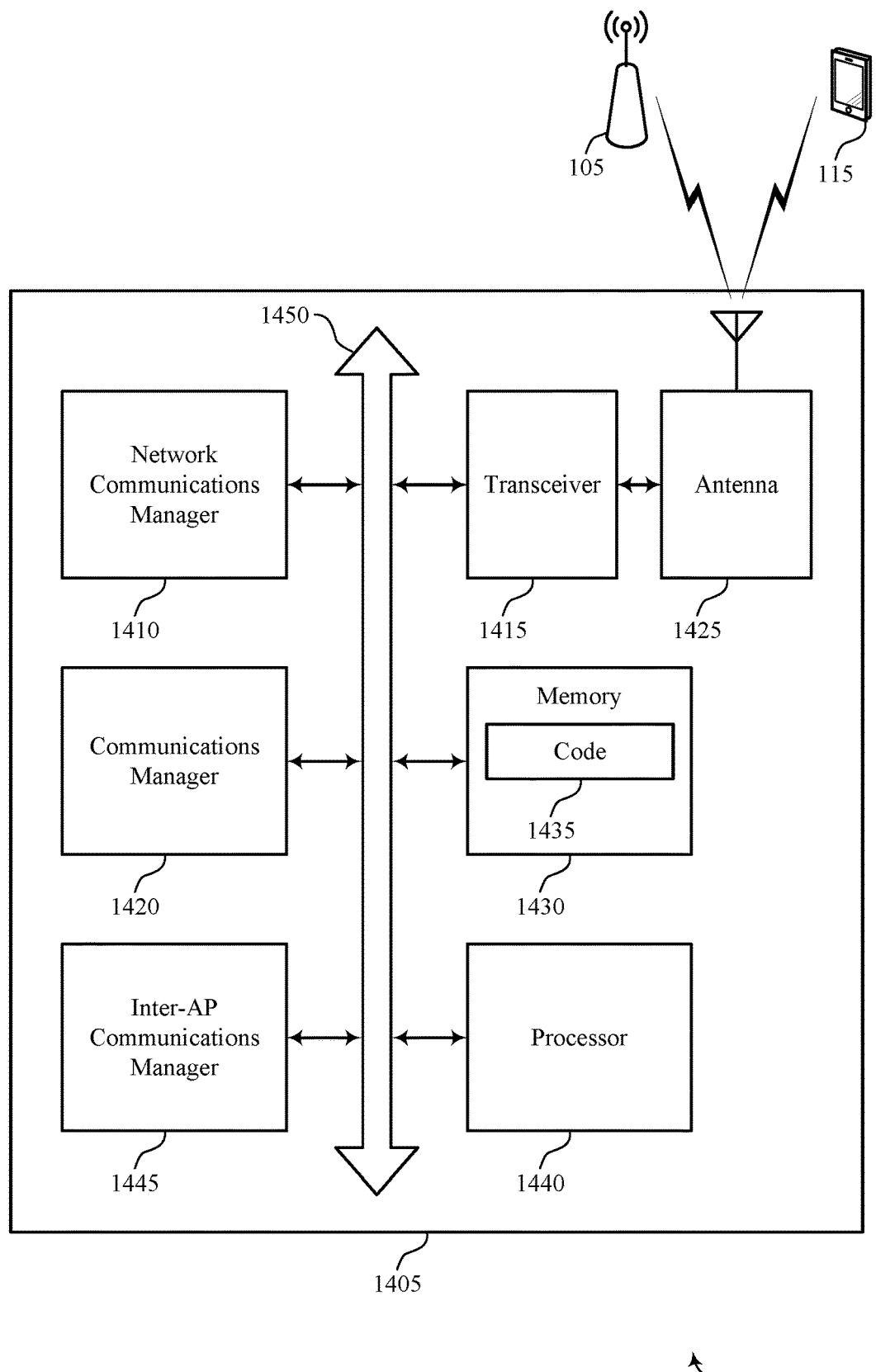
FIG. 14 shows a diagram of a system including a device that supports low-latency parameter updates for XPANs in accordance with one or more aspects of the present disclosure.

FIG. 14 shows a diagram of a system 1400 including a device 1405 that supports low-latency parameter updates for extended personal area networks in accordance with one or more aspects of the present disclosure. The device 1405 may be an example of or include the components of a device 1105, a device 1205, or an AP as described herein. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-AP communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network (e.g., via one or more wired backhaul links). For example, the network communications manager 1410 may manage the transfer of data communications for client devices, such as one or more devices 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets and provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting low-latency parameter updates for extended personal area networks). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other APs 105, and may include a controller or scheduler for controlling communications with devices 115 in cooperation with other APs 105. For example, the inter-station communications manager 1445 may coordinate scheduling for transmissions to APs 105 for various interference mitigation techniques such as beamforming or joint transmission.

The communications manager 1420 may support wireless communication at a wireless communication device in accordance with examples as disclosed herein. For example, the communications manager 1420 may be configured as or otherwise support a means for transmitting, to a first wireless audio device via a first audio data packet and to a second wireless audio device via a second audio data packet, an indication of a set of updated parameters associated with a wireless network (e.g., an extended personal area or audio network). The communications manager 1420 may be configured as or otherwise support a means for receiving a first feedback message from the first wireless audio device and a second feedback message from the second wireless audio device responsive to the first audio data packet and the second audio data packet, respectively. The communications manager 1420 may be configured as or otherwise support a means for transmitting, to one or both of the first wireless audio device and the second wireless audio device, a set of audio data packets in accordance with the set of updated parameters associated with the wireless network and based on receiving the first feedback message and the second feedback message.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, and improved utilization of processing capability.

Figure 15:
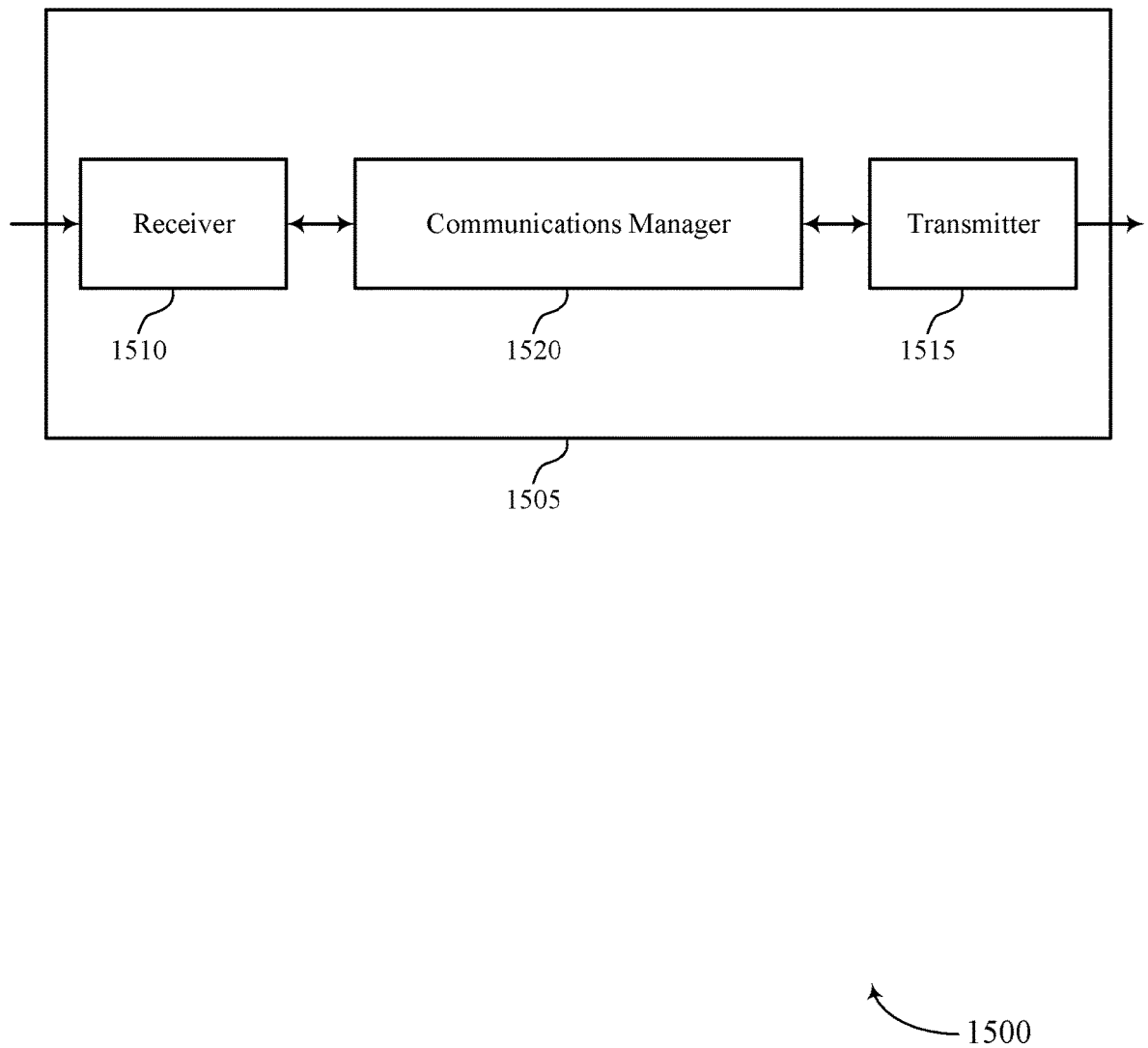
FIGS. 15 and 16 show block diagrams of devices that support low-latency parameter updates for XPANs in accordance with one or more aspects of the present disclosure.

FIG. 15 shows a block diagram 1500 of a device 1505 that supports low-latency parameter updates for extended personal area networks in accordance with one or more aspects of the present disclosure. The device 1505 may be an example of aspects of an STA as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to low-latency parameter updates for extended personal area networks). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to low-latency parameter updates for extended personal area networks). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of low-latency parameter updates for extended personal area networks as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1520 may be configured to perform various operations (e.g., receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations as described herein.

The communications manager 1520 may support wireless communication at a wireless audio device in accordance with examples as disclosed herein. For example, the communications manager 1520 may be configured as or otherwise support a means for receiving, from a wireless communication device via an audio data packet, an indication of a set of updated parameters associated with a wireless network. The communications manager 1520 may be configured as or otherwise support a means for transmitting, to the wireless communication device, a feedback message responsive to the audio data packet. The communications manager 1520 may be configured as or otherwise support a means for receiving, from the wireless communication device, a set of audio data packets in accordance with the set of updated parameters associated with the wireless network and based on transmitting the feedback message.

By including or configuring the communications manager 1520 in accordance with examples as described herein, the device 1505 (e.g., a processor controlling or otherwise coupled with the receiver 1510, the transmitter 1515, the communications manager 1520, or a combination thereof) may support techniques for reduced processing, reduced power consumption, and more efficient utilization of communication resources.

Figure 16:
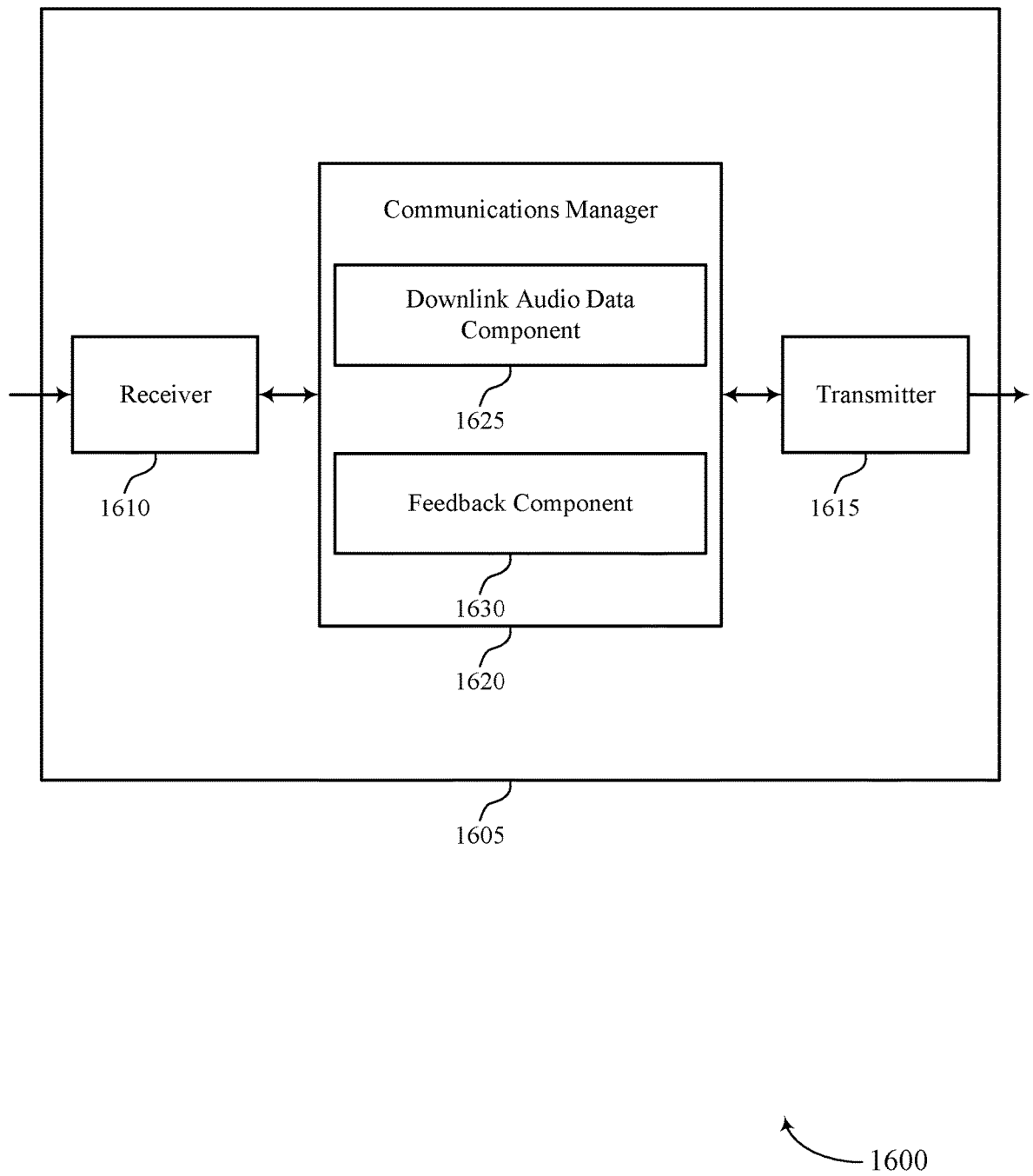

FIG. 16 shows a block diagram 1600 of a device 1605 that supports low-latency parameter updates for extended personal area networks in accordance with one or more aspects of the present disclosure. The device 1605 may be an example of aspects of a device 1505 or an device 115 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to low-latency parameter updates for extended personal area networks). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to low-latency parameter updates for extended personal area networks). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of low-latency parameter updates for extended personal area networks as described herein. For example, the communications manager 1620 may include a downlink audio data component 1625 a feedback component 1630, or any combination thereof. The communications manager 1620 may be an example of aspects of a communications manager 1520 as described herein. In some examples, the communications manager 1620, or various components thereof, may be configured to perform various operations (e.g., receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations as described herein.

The communications manager 1620 may support wireless communication at a wireless audio device in accordance with examples as disclosed herein. The downlink audio data component 1625 may be configured as or otherwise support a means for receiving, from a wireless communication device via an audio data packet, an indication of a set of updated parameters associated with a wireless network. The feedback component 1630 may be configured as or otherwise support a means for transmitting, to the wireless communication device, a feedback message responsive to the audio data packet. The downlink audio data component 1625 may be configured as or otherwise support a means for receiving, from the wireless communication device, a set of audio data packets in accordance with the set of updated parameters associated with the wireless network and based on transmitting the feedback message.

Figure 17:
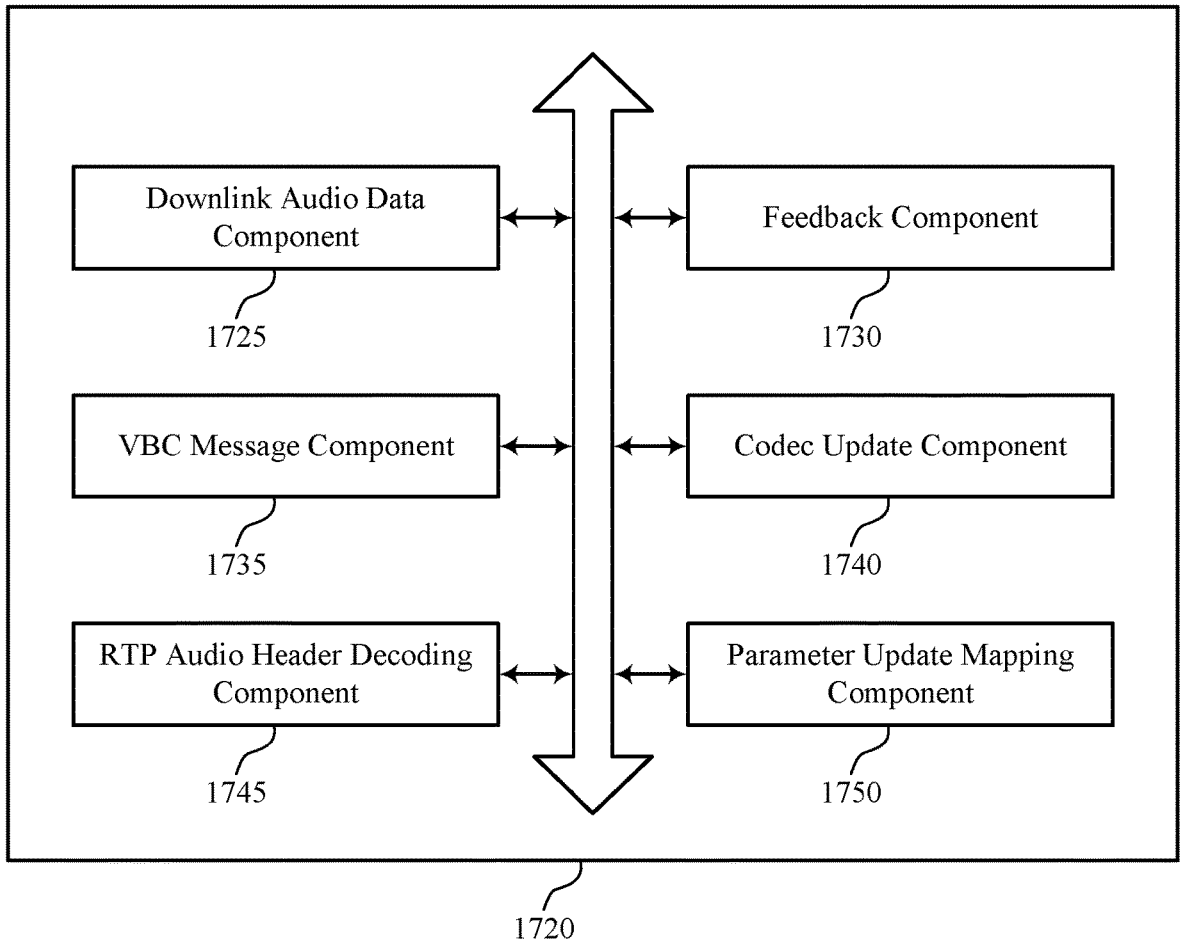
FIG. 17 shows a block diagram of a communications manager that supports low-latency parameter updates for XPANs in accordance with one or more aspects of the present disclosure.

FIG. 17 shows a block diagram 1700 of a communications manager 1720 that supports low-latency parameter updates for extended personal area networks in accordance with one or more aspects of the present disclosure. The communications manager 1720 may be an example of aspects of a communications manager 1520, a communications manager 1620, or both, as described herein. The communications manager 1720, or various components thereof, may be an example of means for performing various aspects of low-latency parameter updates for extended personal area networks as described herein. For example, the communications manager 1720 may include a downlink audio data component 1725, a feedback component 1730, a VBC message component 1735, a codec update component 1740, an RTP audio header decoding component 1745, a parameter update mapping component 1750, or any combination thereof. Each of these components may communicate, directly or indirectly, with one another (e.g., via one or more buses).

The communications manager 1720 may support wireless communication at a wireless audio device in accordance with examples as disclosed herein. The downlink audio data component 1725 may be configured as or otherwise support a means for receiving, from a wireless communication device via an audio data packet, an indication of a set of updated parameters associated with a wireless network. The feedback component 1730 may be configured as or otherwise support a means for transmitting, to the wireless communication device, a feedback message responsive to the audio data packet. In some examples, the downlink audio data component 1725 may be configured as or otherwise support a means for receiving, from the wireless communication device, a set of audio data packets in accordance with the set of updated parameters associated with the wireless network and based on transmitting the feedback message.

In some examples, to support receiving the indication of the set of updated parameters associated with the wireless network, the downlink audio data component 1725 may be configured as or otherwise support a means for receiving the indication of the set of updated parameters via one or more fields of a real-time transport protocol audio header of the audio data packet.

In some examples, the RTP audio header decoding component 1745 may be configured as or otherwise support a means for decoding an extension field of the real-time transport protocol audio header to identify a first value that indicates a presence of the indication of the set of updated parameters in the one or more fields of the real-time transport protocol audio header, where a second value of the extension field indicates an absence of the indication of the set of updated parameters from the one or more fields of the real-time transport protocol audio header. In some examples, the RTP audio header decoding component 1745 may be configured as or otherwise support a means for decoding a count field of the real-time transport protocol audio header to identify a value associated with a quantity of the one or more fields of the real-time transport protocol audio header that include the indication of the set of updated parameters.

In some examples, the one or more fields that include the indication of the set of updated parameters are a set of one or more contributing source fields of the real-time transport protocol audio header.

In some examples, to support receiving the indication of the set of updated parameters associated with the wireless network, the downlink audio data component 1725 may be configured as or otherwise support a means for receiving the indication of the set of updated parameters via a padding section of the audio data packet.

In some examples, the RTP audio header decoding component 1745 may be configured as or otherwise support a means for decoding a padding field of a real-time transport protocol audio header of the audio data packet to identify a first value that indicates a presence of the indication of the set of updated parameters in the padding section of the audio data packet, where a second value of the padding field indicates an absence of the indication of the set of updated parameters from the padding section.

In some examples, the VBC message component 1735 may be configured as or otherwise support a means for transmitting, to the wireless communication device, a voice back channel message including an indication of a second set of updated parameters associated with the wireless network. In some examples, the downlink audio data component 1725 may be configured as or otherwise support a means for receiving, from the wireless communication device, a second set of audio data packets in accordance with the second set of updated parameters.

In some examples, the codec update component 1740 may be configured as or otherwise support a means for updating a codec of the wireless audio device in accordance with the set of updated parameters, where receiving the set of audio data packets in accordance with the set of updated parameters is based on updating the codec of the wireless audio device.

In some examples, the indication of the set of updated parameters are conveyed via one or more sets of bits of the audio data packet. In some examples, each set of bits of the one or more sets of bits includes a first bit-length header and a second bit-length value. In some examples, the first bit-length header indicates an updated parameter of the set of updated parameters. In some examples, the second bit-length value indicates a value for the updated parameter.

In some examples, the indication of the set of updated parameters are conveyed via one or more sets of bits of the audio data packet. In some examples, each set of bits of the one or more sets of bits indicates a value for an updated parameter of the set of updated parameters. In some examples, each set of bits of the one or more sets of bits corresponds to a respective updated parameter of the set of updated parameters in accordance with a mapping.

In some examples, the parameter update mapping component 1750 may be configured as or otherwise support a means for receiving, from the wireless communication device, an indication of the mapping, where the mapping indicates a quantity of bits for each of the one or more sets of bits and an order for the one or more sets of bits in the audio data packet.

In some examples, the audio data packet is transmitted during a first target wake time service interval. In some examples, the set of audio data packets are transmitted during a second target wake time service interval that is immediately consecutive to the first target wake time service interval.

In some examples, the set of updated parameters associated with the wireless network includes a set of one or more target wake time parameters, a measured receive signal strength indicator, a channel switch indication, or a switch from an extended personal area network bearer to a Bluetooth bearer, or any combination thereof.

In some examples, the wireless communication device is a wireless handset or an access point. In some examples, the audio data packet is received from the wireless communication device via a wireless fidelity (Wi-Fi) link between the wireless communication device and the wireless audio device.

Figure 18:
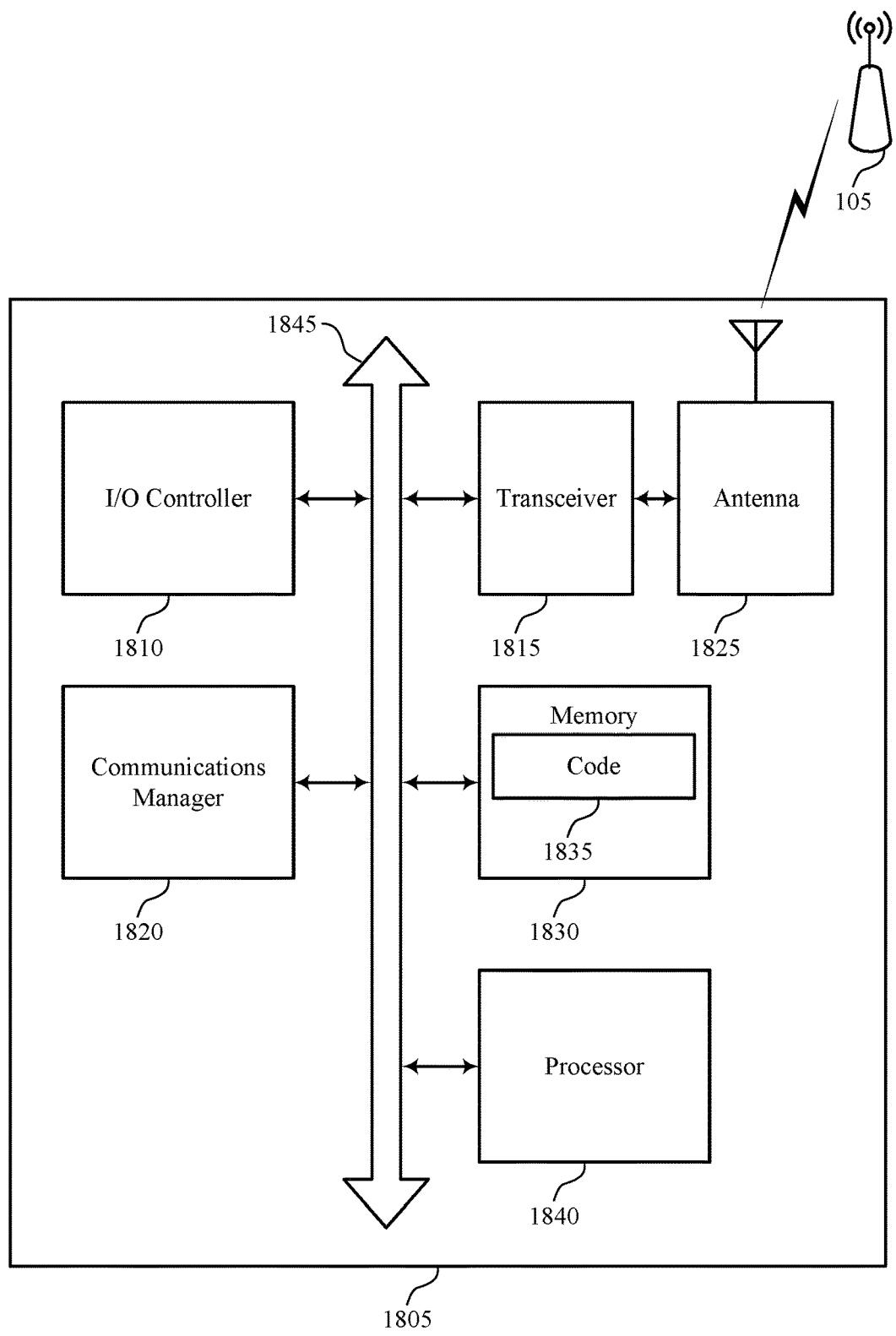
FIG. 18 shows a diagram of a system including a device that supports low-latency parameter updates for XPANs in accordance with one or more aspects of the present disclosure.

FIG. 18 shows a diagram of a system 1800 including a device 1805 that supports low-latency parameter updates for extended personal area networks in accordance with one or more aspects of the present disclosure. The device 1805 may be an example of or include the components of a device 1505, a device 1605, or an STA as described herein. The device 1805 may include components for bi-directional voice and data communications including components for transmitting and receiving communications, such as a communications manager 1820, an I/O controller 1810, a transceiver 1815, an antenna 1825, a memory 1830, code 1835, and a processor 1840. These components may be in electronic communication or otherwise coupled (e.g., operatively, communicatively, functionally, electronically, electrically) via one or more buses (e.g., a bus 1845).

The I/O controller 1810 may manage input and output signals for the device 1805. The I/O controller 1810 may also manage peripherals not integrated into the device 1805. In some cases, the I/O controller 1810 may represent a physical connection or port to an external peripheral. In some cases, the I/O controller 1810 may utilize an operating system such as iOS®, ANDROID®, MS-DOS®, MS-WINDOWS®, OS/2®, UNIX®, LINUX®, or another known operating system. In some other cases, the I/O controller 1810 may represent or interact with a modem, a keyboard, a mouse, a touchscreen, or a similar device. In some cases, the I/O controller 1810 may be implemented as part of a processor, such as the processor 1840. In some cases, a user may interact with the device 1805 via the I/O controller 1810 or via hardware components controlled by the I/O controller 1810.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets and provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting low-latency parameter updates for extended personal area networks). For example, the device 1805 or a component of the device 1805 may include a processor 1840 and memory 1830 coupled with or to the processor 1840, the processor 1840 and memory 1830 configured to perform various functions described herein.

The communications manager 1820 may support wireless communication at a wireless audio device in accordance with examples as disclosed herein. For example, the communications manager 1820 may be configured as or otherwise support a means for receiving, from a wireless communication device via an audio data packet, an indication of a set of updated parameters associated with a wireless network. The communications manager 1820 may be configured as or otherwise support a means for transmitting, to the wireless communication device, a feedback message responsive to the audio data packet. The communications manager 1820 may be configured as or otherwise support a means for receiving, from the wireless communication device, a set of audio data packets in accordance with the set of updated parameters associated with the wireless network and based on transmitting the feedback message.

By including or configuring the communications manager 1820 in accordance with examples as described herein, the device 1805 may support techniques for improved communication reliability, reduced latency, improved user experience related to reduced processing, reduced power consumption, more efficient utilization of communication resources, improved coordination between devices, longer battery life, improved utilization of processing capability.

Figure 19:
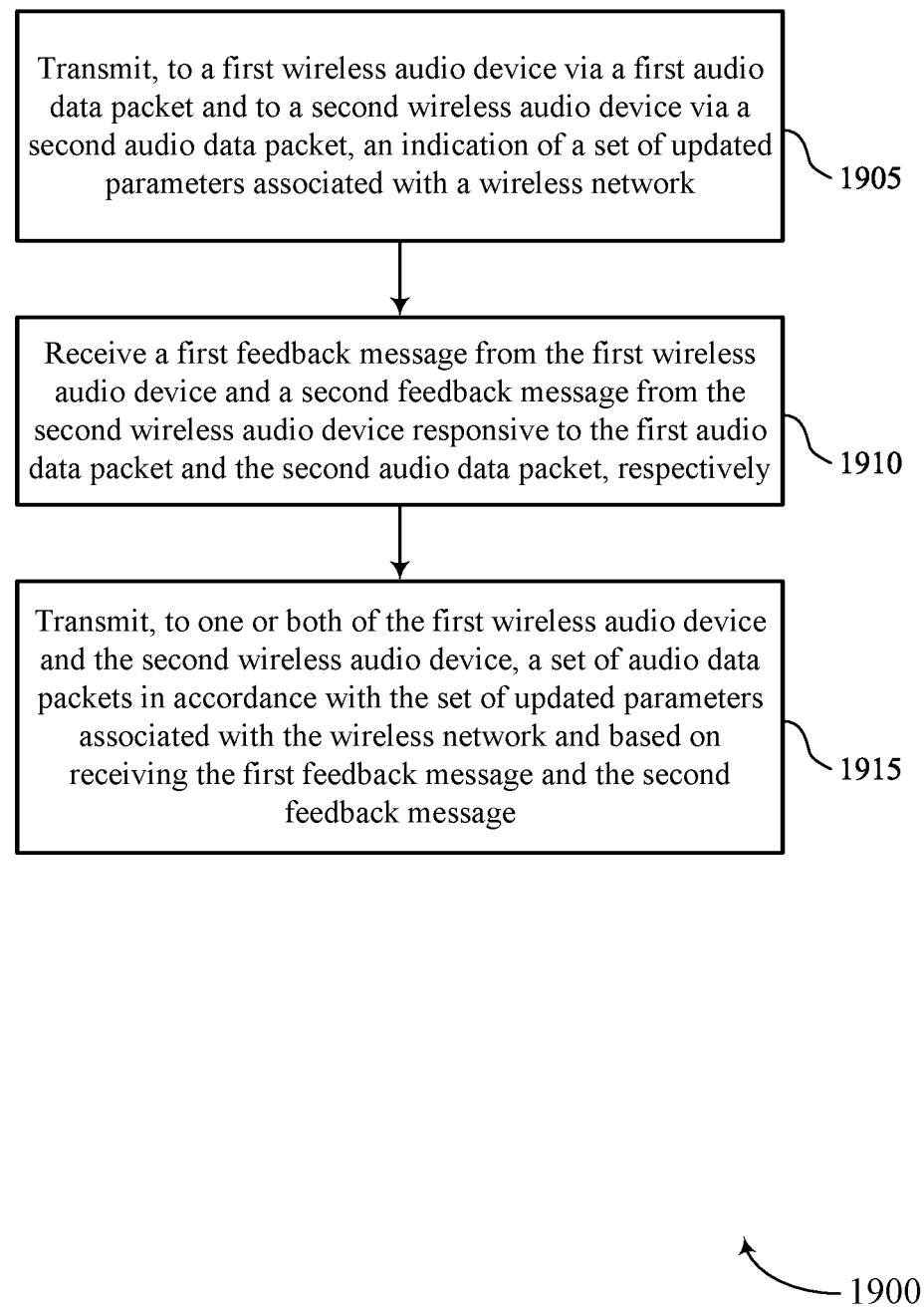
FIGS. 19 and 20 show flowcharts illustrating methods that support low-latency parameter updates for XPANs in accordance with one or more aspects of the present disclosure.

FIG. 19 shows a flowchart illustrating a method 1900 that supports low-latency parameter updates for extended personal area networks in accordance with one or more aspects of the present disclosure. The operations of the method 1900 may be implemented by an AP or its components as described herein. For example, the operations of the method 1900 may be performed by an AP as described with reference to FIGS. 1 through 14. In some examples, an AP may execute a set of instructions to control the functional elements of the AP to perform the described functions. Additionally, or alternatively, the AP may perform aspects of the described functions using special-purpose hardware.

At 1905, the method may include transmitting, to a first wireless audio device via a first audio data packet and to a second wireless audio device via a second audio data packet, an indication of a set of updated parameters associated with a wireless network. The operations of 1905 may be performed in accordance with examples as disclosed herein. In some examples, aspects of the operations of 1905 may be performed by a downlink audio data component 1325 as described with reference to FIG. 13.

At 1910, the method may include receiving a first feedback message from the first wireless audio device and a second feedback message from the second wireless audio device responsive to the first audio data packet and the second audio data packet, respectively. The operations of 1910 may be performed in accordance with examples as disclosed herein. In some examples, aspects of the operations of 1910 may be performed by a feedback component 1330 as described with reference to FIG. 13.

At 1915, the method may include transmitting, to one or both of the first wireless audio device and the second wireless audio device, a set of audio data packets in accordance with the set of updated parameters associated with the wireless network and based on receiving the first feedback message and the second feedback message. The operations of 1915 may be performed in accordance with examples as disclosed herein. In some examples, aspects of the operations of 1915 may be performed by a downlink audio data component 1325 as described with reference to FIG. 13.

Figure 20:
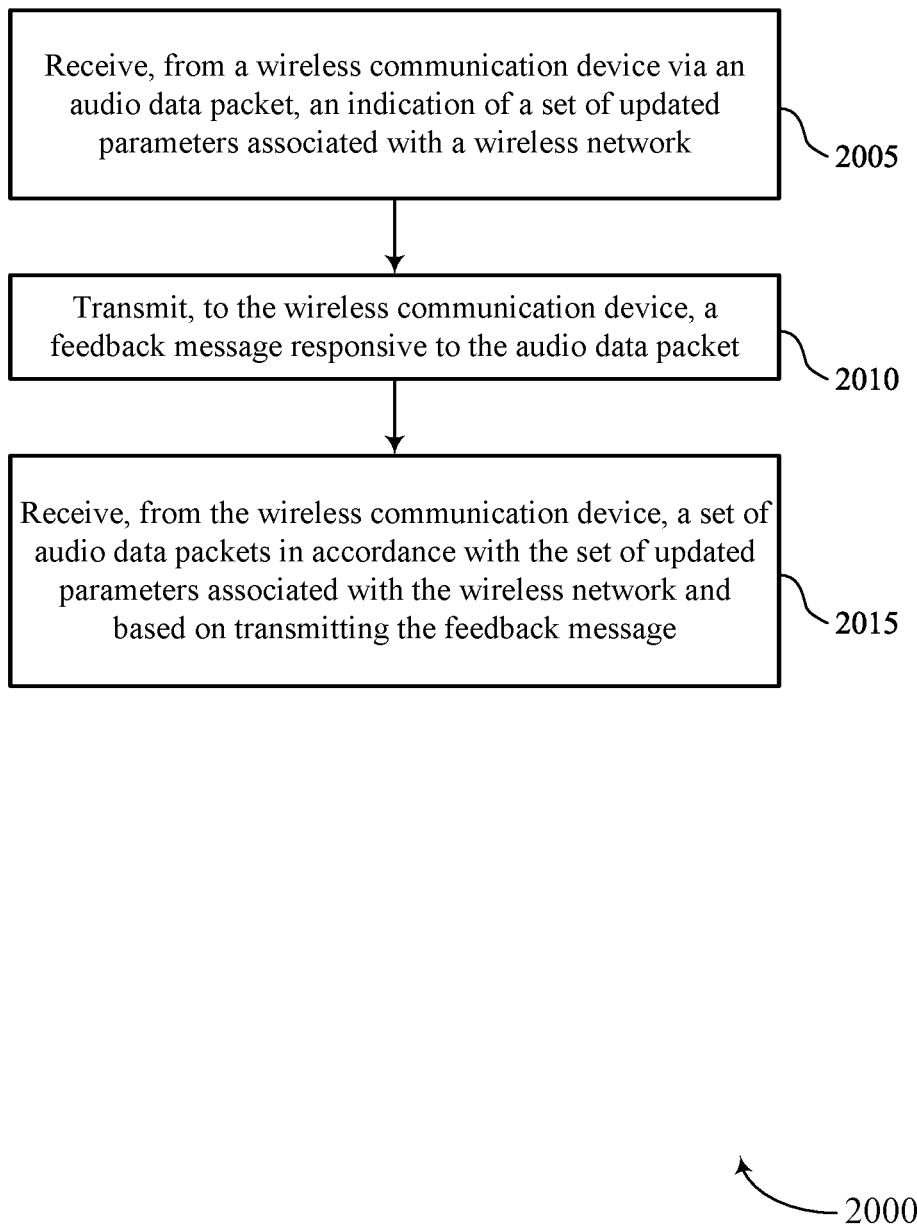

FIG. 20 shows a flowchart illustrating a method 2000 that supports low-latency parameter updates for extended personal area networks in accordance with one or more aspects of the present disclosure. The operations of the method 2000 may be implemented by an STA or its components as described herein. For example, the operations of the method 2000 may be performed by an STA as described with reference to FIGS. 1 through 10 and 15 through 18. In some examples, an STA may execute a set of instructions to control the functional elements of the STA to perform the described functions. Additionally, or alternatively, the STA may perform aspects of the described functions using special-purpose hardware.

At 2005, the method may include receiving, from a wireless communication device via an audio data packet, an indication of a set of updated parameters associated with a wireless network. The operations of 2005 may be performed in accordance with examples as disclosed herein. In some examples, aspects of the operations of 2005 may be performed by a downlink audio data component 1725 as described with reference to FIG. 17.

At 2010, the method may include transmitting, to the wireless communication device, a feedback message responsive to the audio data packet. The operations of 2010 may be performed in accordance with examples as disclosed herein. In some examples, aspects of the operations of 2010 may be performed by a feedback component 1730 as described with reference to FIG. 17.

At 2015, the method may include receiving, from the wireless communication device, a set of audio data packets in accordance with the set of updated parameters associated with the wireless network and based on transmitting the feedback message. The operations of 2015 may be performed in accordance with examples as disclosed herein. In some examples, aspects of the operations of 2015 may be performed by a downlink audio data component 1725 as described with reference to FIG. 17.

Implementation examples are described in the following numbered clauses:

Clause 1: A method for wireless communication at a wireless communication device, comprising: transmitting, to a first wireless audio device via a first audio data packet and to a second wireless audio device via a second audio data packet, an indication of a set of updated parameters associated with a wireless network; receiving a first feedback message from the first wireless audio device and a second feedback message from the second wireless audio device responsive to the first audio data packet and the second audio data packet, respectively; and transmitting, to one or both of the first wireless audio device and the second wireless audio device, a set of audio data packets in accordance with the set of updated parameters associated with the wireless network and based at least in part on receiving the first feedback message and the second feedback message.

Clause 2: The method of clause 1, wherein transmitting the indication of the set of updated parameters associated with the wireless network comprises: transmitting the indication of the set of updated parameters via one or more fields of a real-time transport protocol audio header of each of the first audio data packet and the second audio data packet.

Clause 3: The method of clause 2, further comprising: setting an extension field of the real-time transport protocol audio header to a first value to indicate a presence of the indication of the set of updated parameters in the one or more fields of the real-time transport protocol audio header, wherein a second value of the extension field indicates an absence of the indication of the set of updated parameters from the one or more fields of the real-time transport protocol audio header; and setting a count field of the real-time transport protocol audio header to a value associated with a quantity of the one or more fields of the real-time transport protocol audio header that include the indication of the set of updated parameters.

Clause 4: The method of clause 3, wherein the one or more fields that include the indication of the set of updated parameters are a set of one or more contributing source fields of the real-time transport protocol audio header.

Clause 5: The method of any of clauses 1 through 4, wherein transmitting the indication of the set of updated parameters associated with the wireless network comprises: transmitting the indication of the set of updated parameters via a padding section of each of the first audio data packet and the second audio data packet.

Clause 6: The method of clause 5, further comprising: setting a padding field of a real-time transport protocol audio header of each of the first audio data packet and the second audio data packet to a first value to indicate a presence of the indication of the set of updated parameters in the padding section of the first audio data packet and the second audio data packet, respectively, wherein a second value of the padding field indicates an absence of the indication of the set of updated parameters from the padding section.

Clause 7: The method of any of clauses 1 through 6, further comprising: receiving, from one or both of the first wireless audio device and the second wireless audio device, one or more voice back channel messages including an indication of a second set of updated parameters associated with the wireless network; and transmitting, to one or both of the first wireless audio device and the second wireless audio device, a second set of audio data packets in accordance with the second set of updated parameters.

Clause 8: The method of any of clauses 1 through 7, further comprising: detecting a change in channel conditions between the wireless communication device and at least one of the first wireless audio device and the second wireless audio device or a change in other concurrent communications involving the wireless communication device; and embedding the indication of the set of updated parameters in the first audio data packet and the second audio data packet based at least in part on detecting the change.

Clause 9: The method of any of clauses 1 through 8, wherein the indication of the set of updated parameters are conveyed via one or more sets of bits of the first audio data packet and the second audio data packet, each set of bits of the one or more sets of bits includes a first bit-length header and a second bit-length value, the first bit-length header indicates an updated parameter of the set of updated parameters, and the second bit-length value indicates a value for the updated parameter.

Clause 10: The method of any of clauses 1 through 9, wherein the indication of the set of updated parameters are conveyed via one or more sets of bits of the first audio data packet and the second audio data packet, each set of bits of the one or more sets of bits indicates a value for an updated parameter of the set of updated parameters, and each set of bits of the one or more sets of bits corresponds to a respective updated parameter of the set of updated parameters in accordance with a mapping.

Clause 11: The method of clause 10, further comprising: transmitting, to the first wireless audio device and the second wireless audio device, an indication of the mapping, wherein the mapping indicates a quantity of bits for each of the one or more sets of bits and an order for the one or more sets of bits in the first audio data packet and the second audio data packet.

Clause 12: The method of any of clauses 1 through 11, wherein the first audio data packet and the second audio data packet are transmitted during a first TWT service interval, and the set of audio data packets are transmitted during a second TWT service interval that is immediately consecutive to the first TWT service interval.

Clause 13: The method of any of clauses 1 through 12, wherein the set of updated parameters associated with the wireless network comprises a set of one or more TWT parameters, a measured receive signal strength indicator, a channel switch indication, or a switch from an extended personal area network bearer to a Bluetooth bearer, or any combination thereof.

Clause 14: The method of any of clauses 1 through 13, wherein the wireless communication device is a wireless handset or an access point, and the first audio data packet is transmitted to the first wireless audio device via a first Wi-Fi link between the wireless communication device and the first wireless audio device and the second audio data packet is transmitted to the second wireless audio device via a second Wi-Fi link between the wireless communication device and the second wireless audio device.

Clause 15: A method for wireless communication at a wireless audio device, comprising: receiving, from a wireless communication device via an audio data packet, an indication of a set of updated parameters associated with a wireless network; transmitting, to the wireless communication device, a feedback message responsive to the audio data packet; and receiving, from the wireless communication device, a set of audio data packets in accordance with the set of updated parameters associated with the wireless network and based at least in part on transmitting the feedback message.

Clause 16: The method of clause 15, wherein receiving the indication of the set of updated parameters associated with the wireless network comprises: receiving the indication of the set of updated parameters via one or more fields of a real-time transport protocol audio header of the audio data packet.

Clause 17: The method of clause 16, further comprising: decoding an extension field of the real-time transport protocol audio header to identify a first value that indicates a presence of the indication of the set of updated parameters in the one or more fields of the real-time transport protocol audio header, wherein a second value of the extension field indicates an absence of the indication of the set of updated parameters from the one or more fields of the real-time transport protocol audio header; and decoding a count field of the real-time transport protocol audio header to identify a value associated with a quantity of the one or more fields of the real-time transport protocol audio header that include the indication of the set of updated parameters.

Clause 18: The method of clause 17, wherein the one or more fields that include the indication of the set of updated parameters are a set of one or more contributing source fields of the real-time transport protocol audio header.

Clause 19: The method of any of clauses 15 through 18, wherein receiving the indication of the set of updated parameters associated with the wireless network comprises: receiving the indication of the set of updated parameters via a padding section of the audio data packet.

Clause 20: The method of clause 19, further comprising: decoding a padding field of a real-time transport protocol audio header of the audio data packet to identify a first value that indicates a presence of the indication of the set of updated parameters in the padding section of the audio data packet, wherein a second value of the padding field indicates an absence of the indication of the set of updated parameters from the padding section.

Clause 21: The method of any of clauses 15 through 20, further comprising: transmitting, to the wireless communication device, a voice back channel message including an indication of a second set of updated parameters associated with the wireless network; and receiving, from the wireless communication device, a second set of audio data packets in accordance with the second set of updated parameters.

Clause 22: The method of any of clauses 15 through 21, further comprising: updating a codec of the wireless audio device in accordance with the set of updated parameters, wherein receiving the set of audio data packets in accordance with the set of updated parameters is based at least in part on updating the codec of the wireless audio device.

Clause 23: The method of any of clauses 15 through 22, wherein the indication of the set of updated parameters are conveyed via one or more sets of bits of the audio data packet, each set of bits of the one or more sets of bits includes a first bit-length header and a second bit-length value, the first bit-length header indicates an updated parameter of the set of updated parameters, and the second bit-length value indicates a value for the updated parameter.

Clause 24: The method of any of clauses 15 through 23, wherein the indication of the set of updated parameters are conveyed via one or more sets of bits of the audio data packet, each set of bits of the one or more sets of bits indicates a value for an updated parameter of the set of updated parameters, and each set of bits of the one or more sets of bits corresponds to a respective updated parameter of the set of updated parameters in accordance with a mapping.

Clause 25: The method of clause 24, further comprising: receiving, from the wireless communication device, an indication of the mapping, wherein the mapping indicates a quantity of bits for each of the one or more sets of bits and an order for the one or more sets of bits in the audio data packet.

Clause 26: The method of any of clauses 15 through 25, wherein the audio data packet is transmitted during a first TWT service interval, and the set of audio data packets are transmitted during a second TWT service interval that is immediately consecutive to the first TWT service interval.

Clause 27: The method of any of clauses 15 through 26, wherein the set of updated parameters associated with the wireless network comprises a set of one or more TWT parameters, a measured receive signal strength indicator, a channel switch indication, or a switch from an extended personal area network bearer to a Bluetooth bearer, or any combination thereof.

Clause 28: The method of any of clauses 15 through 27, wherein the wireless communication device is a wireless handset or an access point, and the audio data packet is received from the wireless communication device via a Wi-Fi link between the wireless communication device and the wireless audio device.

Clause 29: An apparatus for wireless communication at a wireless communication device, comprising a processor; memory coupled with the processor; and instructions stored in the memory and executable by the processor to cause the apparatus to perform a method of any of clauses 1 through 14.

Clause 30: An apparatus for wireless communication at a wireless communication device, comprising at least one means for performing a method of any of clauses 1 through 14.

Clause 31: A non-transitory computer-readable medium storing code for wireless communication at a wireless communication device, the code comprising instructions executable by a processor to perform a method of any of clauses 1 through 14.

Clause 32: An apparatus for wireless communication at a wireless audio device, comprising a processor; memory coupled with the processor; and instructions stored in the memory and executable by the processor to cause the apparatus to perform a method of any of clauses 15 through 28.

Clause 33: An apparatus for wireless communication at a wireless audio device, comprising at least one means for performing a method of any of clauses 15 through 28.

Clause 34: A non-transitory computer-readable medium storing code for wireless communication at a wireless audio device, the code comprising instructions executable by a processor to perform a method of any of clauses 15 through 28.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. An apparatus for wireless communication at a wireless communication device, comprising:
    a processor;
    memory coupled with the processor; and
    instructions stored in the memory and executable by the processor to cause the apparatus to:
        transmit, to a first wireless audio device via a first audio data packet and to a second wireless audio device via a second audio data packet, an indication of a set of updated parameters associated with a wireless network;
        receive a first feedback message from the first wireless audio device and a second feedback message from the second wireless audio device responsive to the first audio data packet and the second audio data packet, respectively; and
        transmit, to one or both of the first wireless audio device and the second wireless audio device, a set of audio data packets in accordance with the set of updated parameters associated with the wireless network and based at least in part on receiving the first feedback message and the second feedback message.

2. The apparatus of claim 1, wherein the instructions to transmit the indication of the set of updated parameters associated with the wireless network are executable by the processor to cause the apparatus to:
    transmit the indication of the set of updated parameters via one or more fields of a real-time transport protocol audio header of each of the first audio data packet and the second audio data packet.

3. The apparatus of claim 2, wherein the instructions are further executable by the processor to cause the apparatus to:

set an extension field of the real-time transport protocol audio header to a first value to indicate a presence of the indication of the set of updated parameters in the one or more fields of the real-time transport protocol audio header, wherein a second value of the extension field indicates an absence of the indication of the set of updated parameters from the one or more fields of the real-time transport protocol audio header; and set a count field of the real-time transport protocol audio header to a value associated with a quantity of the one or more fields of the real-time transport protocol audio header that include the indication of the set of updated parameters.

4. The apparatus of claim 3, wherein the one or more fields that include the indication of the set of updated parameters are a set of one or more contributing source fields of the real-time transport protocol audio header.

5. The apparatus of claim 1, wherein the instructions to transmit the indication of the set of updated parameters associated with the wireless network are executable by the processor to cause the apparatus to:
transmit the indication of the set of updated parameters via a padding section of each of the first audio data packet and the second audio data packet.

6. The apparatus of claim 5, wherein the instructions are further executable by the processor to cause the apparatus to:
set a padding field of a real-time transport protocol audio header of each of the first audio data packet and the second audio data packet to a first value to indicate a presence of the indication of the set of updated parameters in the padding section of the first audio data packet and the second audio data packet, respectively, wherein a second value of the padding field indicates an absence of the indication of the set of updated parameters from the padding section.

7. The apparatus of claim 1, wherein the instructions are further executable by the processor to cause the apparatus to:
receive, from one or both of the first wireless audio device and the second wireless audio device, one or more voice back channel messages including an indication of a second set of updated parameters associated with the wireless network; and
transmit, to one or both of the first wireless audio device and the second wireless audio device, a second set of audio data packets in accordance with the second set of updated parameters.

8. The apparatus of claim 1, wherein the instructions are further executable by the processor to cause the apparatus to:
detect a change in channel conditions between the wireless communication device and at least one of the first wireless audio device and the second wireless audio device or a change in other concurrent communications involving the wireless communication device; and
embed the indication of the set of updated parameters in the first audio data packet and the second audio data packet based at least in part on detecting the change.

9. The apparatus of claim 1, wherein the indication of the set of updated parameters are conveyed via one or more sets of bits of the first audio data packet and the second audio data packet, wherein each set of bits of the one or more sets of bits includes a first bit-length header and a second bit-length value, wherein the first bit-length header indicates an updated parameter of the set of updated parameters, and wherein the second bit-length value indicates a value for the updated parameter.

10. The apparatus of claim 1, wherein the indication of the set of updated parameters are conveyed via one or more sets of bits of the first audio data packet and the second audio data packet, wherein each set of bits of the one or more sets of bits indicates a value for an updated parameter of the set of updated parameters, and wherein each set of bits of the one or more sets of bits corresponds to a respective updated parameter of the set of updated parameters in accordance with a mapping.

11. The apparatus of claim 10, wherein the instructions are further executable by the processor to cause the apparatus to:
transmit, to the first wireless audio device and the second wireless audio device, an indication of the mapping, wherein the mapping indicates a quantity of bits for each of the one or more sets of bits and an order for the one or more sets of bits in the first audio data packet and the second audio data packet.

12. The apparatus of claim 1, wherein the first audio data packet and the second audio data packet are transmitted during a first target wake time service interval, and wherein the set of audio data packets are transmitted during a second target wake time service interval that is immediately consecutive to the first target wake time service interval.

13. The apparatus of claim 1, wherein the set of updated parameters associated with the wireless network comprises a set of one or more target wake time parameters, a measured receive signal strength indicator, a channel switch indication, or a switch from an extended personal area network bearer to a Bluetooth bearer, or any combination thereof.

14. The apparatus of claim 1, wherein the wireless communication device is a wireless handset or an access point, and wherein the first audio data packet is transmitted to the first wireless audio device via a first wireless fidelity (Wi-Fi) link between the wireless communication device and the first wireless audio device and the second audio data packet is transmitted to the second wireless audio device via a second Wi-Fi link between the wireless communication device and the second wireless audio device.

15. An apparatus for wireless communication at a wireless audio device, comprising:
a processor;
memory coupled with the processor; and
instructions stored in the memory and executable by the processor to cause the apparatus to:
receive, from a wireless communication device via an audio data packet, an indication of a set of updated parameters associated with a wireless network;
transmit, to the wireless communication device, a feedback message responsive to the audio data packet; and
receive, from the wireless communication device, a set of audio data packets in accordance with the set of updated parameters associated with the wireless network and based at least in part on transmitting the feedback message.

16. The apparatus of claim 15, wherein the instructions to receive the indication of the set of updated parameters associated with the wireless network are executable by the processor to cause the apparatus to:
receive the indication of the set of updated parameters via one or more fields of a real-time transport protocol audio header of the audio data packet.

17. The apparatus of claim 16, wherein the instructions are further executable by the processor to cause the apparatus to:
decode an extension field of the real-time transport protocol audio header to identify a first value that indicates a presence of the indication of the set of updated parameters in the one or more fields of the real-time transport protocol audio header, wherein a second value of the extension field indicates an absence of the indication of the set of updated parameters from the one or more fields of the real-time transport protocol audio header; and decode a count field of the real-time transport protocol audio header to identify a value associated with a quantity of the one or more fields of the real-time transport protocol audio header that include the indication of the set of updated parameters.

18. The apparatus of claim 17, wherein the one or more fields that include the indication of the set of updated parameters are a set of one or more contributing source fields of the real-time transport protocol audio header.

19. The apparatus of claim 15, wherein the instructions to receive the indication of the set of updated parameters associated with the wireless network are executable by the processor to cause the apparatus to:

receive the indication of the set of updated parameters via a padding section of the audio data packet.

20. The apparatus of claim 19, wherein the instructions are further executable by the processor to cause the apparatus to:

decode a padding field of a real-time transport protocol audio header of the audio data packet to identify a first value that indicates a presence of the indication of the set of updated parameters in the padding section of the audio data packet, wherein a second value of the padding field indicates an absence of the indication of the set of updated parameters from the padding section.

21. The apparatus of claim 15, wherein the instructions are further executable by the processor to cause the apparatus to:

transmit, to the wireless communication device, a voice back channel message including an indication of a second set of updated parameters associated with the wireless network; and receive, from the wireless communication device, a second set of audio data packets in accordance with the second set of updated parameters.

22. A method for wireless communication at a wireless communication device, comprising:

transmitting, to a first wireless audio device via a first audio data packet and to a second wireless audio device via a second audio data packet, an indication of a set of updated parameters associated with a wireless network;

receiving a first feedback message from the first wireless audio device and a second feedback message from the second wireless audio device responsive to the first audio data packet and the second audio data packet, respectively; and transmitting, to one or both of the first wireless audio device and the second wireless audio device, a set of audio data packets in accordance with the set of updated parameters associated with the wireless network and based at least in part on receiving the first feedback message and the second feedback message.

23. The method of claim 22, wherein transmitting the indication of the set of updated parameters associated with the wireless network comprises:

transmitting the indication of the set of updated parameters via one or more fields of a real-time transport protocol audio header of each of the first audio data packet and the second audio data packet.

24. The method of claim 22, wherein transmitting the indication of the set of updated parameters associated with the wireless network comprises:

transmitting the indication of the set of updated parameters via a padding section of each of the first audio data packet and the second audio data packet.

25. A method for wireless communication at a wireless audio device, comprising:

receiving, from a wireless communication device via an audio data packet, an indication of a set of updated parameters associated with a wireless network;

transmitting, to the wireless communication device, a feedback message responsive to the audio data packet; and receiving, from the wireless communication device, a set of audio data packets in accordance with the set of updated parameters associated with the wireless network and based at least in part on transmitting the feedback message.

26. The method of claim 25, further comprising:

updating a codec of the wireless audio device in accordance with the set of updated parameters, wherein receiving the set of audio data packets in accordance with the set of updated parameters is based at least in part on updating the codec of the wireless audio device.

27. The method of claim 25, wherein the indication of the set of updated parameters are conveyed via one or more sets of bits of the audio data packet, wherein each set of bits of the one or more sets of bits includes a first bit-length header and a second bit-length value, wherein the first bit-length header indicates an updated parameter of the set of updated parameters, and wherein the second bit-length value indicates a value for the updated parameter.

28. The method of claim 25, wherein the indication of the set of updated parameters are conveyed via one or more sets of bits of the audio data packet, wherein each set of bits of the one or more sets of bits indicates a value for an updated parameter of the set of updated parameters, and wherein each set of bits of the one or more sets of bits corresponds to a respective updated parameter of the set of updated parameters in accordance with a mapping.

29. The method of claim 28, further comprising:

receiving, from the wireless communication device, an indication of the mapping, wherein the mapping indicates a quantity of bits for each of the one or more sets of bits and an order for the one or more sets of bits in the audio data packet.

30. The method of claim 25, wherein the audio data packet is transmitted during a first target wake time service interval, and wherein the set of audio data packets are transmitted during a second target wake time service interval that is immediately consecutive to the first target wake time service interval.

* * * * *